(12) United States Patent
Suzuki

(10) Patent No.: US 9,263,730 B2
(45) Date of Patent: Feb. 16, 2016

(54) ELECTRODE FOR LITHIUM-ION SECONDARY BATTERY AND MANUFACTURING PROCESS FOR THE SAME

(75) Inventor: Shinji Suzuki, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 337 days.

(21) Appl. No.: 13/638,430

(22) PCT Filed: Apr. 18, 2011

(86) PCT No.: PCT/JP2011/002254
§ 371 (c)(1),
(2), (4) Date: Sep. 28, 2012

(87) PCT Pub. No.: WO2011/142083
PCT Pub. Date: Nov. 17, 2011

(65) Prior Publication Data
US 2013/0022867 A1  Jan. 24, 2013

(30) Foreign Application Priority Data
May 12, 2010 (JP) ................. 2010-110511

(51) Int. Cl.
*H01M 4/13* (2010.01)
*H01M 4/134* (2010.01)
(Continued)

(52) U.S. Cl.
CPC ............. *H01M 4/13* (2013.01); *H01M 4/366* (2013.01); *H01M 4/621* (2013.01); *H01M 4/622* (2013.01); *H01M 10/0525* (2013.01); *Y02E 60/122* (2013.01); *Y02P 70/54* (2015.11)

(58) Field of Classification Search
CPC ....... H01M 4/13; H01M 4/366; H01M 4/621; H01M 4/622
USPC ......................................................... 429/211
See application file for complete search history.

(56) References Cited

U.S. PATENT DOCUMENTS

2003/0040578 A1*  2/2003  Sugo et al. ............. 525/100
2006/0099495 A1*  5/2006  Suzuki et al. ........... 429/128
(Continued)

FOREIGN PATENT DOCUMENTS

| JP | 10-270013 A | 10/1998 |
| JP | 11-126600 A | 5/1999 |

(Continued)

OTHER PUBLICATIONS

Terasaki et al., Machine translation of JP 10-270013 A, Oct. 1998.*
(Continued)

*Primary Examiner* — Sean P Cullen
(74) *Attorney, Agent, or Firm* — Sughrue Mion, PLLC

(57) ABSTRACT

An electrode for a lithium-ion secondary battery includes a current collector and an electrode layer formed on a surface of the current collector, and including a binder resin, an active material and a conductive additive. The electrode layer includes a first electrode layer and a second electrode layer whose binder-resin concentration is higher than a binder-resin concentration in the first electrode layer. The first electrode layer is disposed on the surface of the current collector and the second electrode layer is disposed on the surface of the current collector at least so as to make contact with the surface of the current collector and at least a side face of the first electrode layer.

12 Claims, 13 Drawing Sheets

(51) Int. Cl.
  *H01M 4/139* (2010.01)
  *H01M 4/62* (2006.01)
  *H01M 4/36* (2006.01)
  *H01M 10/0525* (2010.01)

(56) References Cited

U.S. PATENT DOCUMENTS

| | | | |
|---|---|---|---|
| 2006/0127773 A1* | 6/2006 | Kawakami et al. | 429/245 |
| 2006/0134518 A1 | 6/2006 | Kogetsu et al. | |
| 2008/0102370 A1 | 5/2008 | Kashiwagi | |
| 2008/0318133 A1* | 12/2008 | Matsuyama et al. | 429/300 |
| 2010/0221607 A1* | 9/2010 | Hatanaka et al. | 429/209 |

FOREIGN PATENT DOCUMENTS

| | | |
|---|---|---|
| JP | 2000-011997 A | 1/2000 |
| JP | 2000-012091 A | 1/2000 |
| JP | 2006-196447 A | 7/2006 |
| JP | 2008059876 A * | 3/2008 |
| JP | 2008-117574 A | 5/2008 |
| JP | 2010-092622 A | 4/2010 |
| JP | 2010-165471 A | 7/2010 |
| JP | 2010-182479 A | 8/2010 |
| WO | WO 2009008160 A1 * | 1/2009 |

OTHER PUBLICATIONS

Tamakoshi, H., Machine translation of JP 2008-059876 A, Mar. 2008.*

* cited by examiner (a)

(b)

ELECTRODE FOR LITHIUM-ION SECONDARY BATTERY AND MANUFACTURING PROCESS FOR THE SAME

CROSS REFERENCE TO RELATED APPLICATIONS

This application is a National Stage of International Application No. PCT/JP2011/002254 filed Apr. 18, 2011, claiming priority based on Japanese Patent Application No. 2010-110511, filed May 12, 2010, the contents of all of which are incorporated herein by reference in their entirety.

TECHNICAL FIELD

The present invention is one which relates to an electrode for lithium-ion secondary battery, and to a manufacturing process for the same.

BACKGROUND ART

Downsizing electronic devices, and making them lightweight have been progressing, so secondary batteries whose energy densities are higher have been desired as their electric power source. A secondary battery is one which takes out chemical energy, which a positive-electrode active material and negative-electrode active material possess by means of chemical reactions via an electrolyte, to the outside as electric energy. In such secondary batteries, lithium-ion secondary batteries are secondary batteries that possess the highest energy density among those which have been put into practical applications.

In lithium-ion secondary battery, lithium-containing metallic composite oxides, such as lithium-cobalt composite oxides, have been used mainly as an active material for the positive electrode; whereas carbon materials having multi-layered structures, which are capable of inserting lithium ions between the layers (i.e., the formation of lithium intercalation compound) as well as releasing lithium ions from between the layers, have been used mainly as for the negative electrode.

A polar plate for the positive electrode and negative electrode is made as follows. Each of the active materials, and a binder resin are dispersed in a solvent to make a slurry. This slurry is coated onto each of the metallic foils, namely, the current collectors. Subsequently, the solvent being included in the slurry is dried to remove in order to form each of the active-material layers on the current collectors, respectively. Then, the active-material layer and current collector are compression-molded by a roller-pressing machine, thereby completing a positive-electrode polar plate or negative-electrode polar plate.

Recently, as a negative-electrode active material for lithium-ion secondary battery, the development of next-generation negative-electrode active materials possessing charging/discharging capacities that greatly exceed the theoretical capacity of carbon material has been progressing. For example, materials including metals, such as Si and Sn that are capable of alloying with lithium, have been expected therefor.

In a case where Si or Sn, and the like, is used for an active material, these materials exhibit large volumetric changes being accompanied by the absorption/release of lithium at the time of charging/discharging. Consequently, it is difficult to satisfactorily maintain the bonding state between these materials and current collectors. These materials expand and contract repeatedly during charging/discharging cycles, as being accompanied by the absorption and release of lithium. Because of such expansions and contractions of active material, the active-material particles have been pulverized, or the active-material particles have fallen down from current collector. Because of the pulverization of active material, or because of the falling-down from current collector, the resulting cyclability of lithium-ion secondary battery becomes worse considerably.

Regarding those in which a carbon material is used as the active material, methods for suppressing the active material from falling down from current collectors have been investigated. Moreover, in active materials for positive electrode as well, methods for suppressing the active materials from falling down from current collector have been investigated.

For example, Patent Literature No. 1 sets forth an electrode for non-aqueous-electrolyte secondary battery being characterized in that, in an electrode being completed by laminating an electrode mixture-agent paste, which is made by kneading an electrode raw-material powder together with a binder as well as a solvent, onto a current collector in order to form an electrode mixture-material layer thereon, a binder concentration within the electrode mixture-agent layer is made so as to be more concentrated near the current collector. It discloses electrodes, which used polyvinylidene fluoride as the binder, an $LiCoO_2$ powder as the positive-electrode raw-material powder and a carbon material as the negative-electrode raw-material powder, in some of the specific examples.

Patent Literature No. 1: Japanese Unexamined Patent Publication (KOKAI) Gazette No. 10-270013

DISCLOSURE OF THE INVENTION

Assignment to be Solved by the Invention

FIG. 1 is used to make explanations on matters being imaginable about a mechanism by which an active material would fall down due to the active material's volumetric changes that are accompanied by the absorption/release of lithium. FIG. 1 is an explanatory diagram that illustrates the falling-down of an active material being accompanied by the absorption/release of lithium.

FIG. 1(a) sets forth a situation where an active material 2 and a conductive additive 5 are bound together onto a current collector 1 by means of a binder 3. Since the active material 2 turns into a lithium-absorbed active material 4 as being accompanied by the absorption of lithium, the volume becomes larger. FIG. 1(b) sets forth the circumstances.

As can be seen from FIG. 1(b), the binder 3 moves from the positions shown in FIG. 1(a) as being accompanied by the volumetric changes of the active material 2. Next, the lithium-absorbed active material 4 turns back into the active material 2 as being accompanied by the release of lithium. FIG. 1(c) sets forth the circumstances.

As can be seen from FIG. 1(c), the volume diminishes due to the lithium-absorbed active material 4 that turns back into the active material 2. In that instance, some members of the binder 3 arise not to follow the diminishing volume. If it should take place in that way, it is possible to imagine that some members of the active material 2, which are not bound together by the binder 3, would fall down from the current collector 1.

In the case of active materials that thus exhibit large volumetric changes being accompanied by the absorption/release of lithium, it is less likely to believe that the method being set forth in aforementioned Patent Literature No. 1 is an effective means for preventing the active materials from falling down. Consequently, even when an active material, which exhibits large volumetric changes being accompanied by the absorption/release of lithium, is used in lithium-ion secondary battery, further investigations have been desired for methods for suppressing the falling-down of the active material.

The present inventors had investigated the above earnestly to devise a negative electrode for lithium-ion secondary battery, and then proposed it in Japanese Patent Application No. 2009-023546, the negative electrode being characterized in that, in a negative electrode for lithium-ion secondary battery comprising: a current collector; and an electrode layer that is disposed on a surface of the current collector and includes a binder resin, an active material and a conductive additive, the aforementioned electrode layer comprises: a first electrode layer; and a second electrode layer whose binder-resin concentration is higher than a binder-resin concentration in the first electrode layer, and whose thickness is thinner than a thickness of the first electrode layer; and the first electrode layer is disposed between the current collector and the second electrode layer. As being set forth in the specification of Japanese Patent Application No. 2009-023546, it is possible for the aforementioned negative electrode for lithium-ion secondary battery to suppress the falling-down of an active material even when the used active material exhibits large volumetric changes being accompanied by the absorption/release of lithium.

The present inventors have been continually investigated in order to further improve the invention being set forth in the specification of Japanese Patent Application No. 2009-023546.

The present invention is one which has been done in view of such circumstances. It aims at providing an electrode for lithium-ion secondary battery, electrode which furthermore suppresses an active material from coming off or falling down from a current collector even when the active material exhibits large volumetric changes being accompanied by the absorption/release of lithium, and which exhibits a much better cyclability, as well as providing a manufacturing process for the same.

Means for Solving the Assignment

As a result of the present inventors' earnest investigations, they found out that it is possible to provide an electrode for lithium-ion secondary battery, which suppresses an active material from coming off or falling down from a current collector even when the used active material exhibits large volumetric changes being accompanied by the absorption/release of lithium, and which exhibits a much better cyclability, by means of providing the electrode with: a first electrode layer that is disposed on a surface of the current collector; a second electrode layer whose binder-resin concentration is higher than a binder-resin concentration in the first electrode layer, and which is disposed on the surface of the current collector at least so as to make contact with the surface of the current collector and at least a side face of the first electrode layer.

Specifically, an electrode for lithium-ion secondary battery according to the present invention is characterized in that, in an electrode for lithium-ion secondary battery having: a current collector; and an electrode layer being formed on a surface of the current collector, and including a binder resin, an active material and a conductive additive, the electrode layer comprises: a first electrode layer; and a second electrode layer whose binder-resin concentration is higher than a binder-resin concentration in the first electrode layer;

the first electrode layer is disposed on the surface of the current collector; and the second electrode layer is disposed on the surface of the current collector at least so as to make contact with the surface of the current collector and at least a side face of the first electrode layer.

Since the electrode for lithium-ion secondary battery according to the present invention comprises the second electrode layer whose binder-resin concentration is higher, it is possible for the present electrode to suppress the coming off or falling down of the active material from the current collector that arises from the binder resin that cannot follow volumetric fluctuations in the active material.

The volume of the active material is increased by means of the absorption of lithium, and thereby the first electrode layer expands. The first electrode layer expands in parallel directions that are parallel to one of the opposite surfaces of the first electrode layer, and in perpendicular directions that are perpendicular to the opposite surface. It was understood that suppressing this parallelly-oriented expansion of the first electrode layer is a wise measure for suppressing the active material, which is present in the first electrode layer, from coming off or falling down from the current collector. Since the second electrode layer, whose binder-resin concentration is higher, is disposed so as to make contact with at least one of the side faces of the first electrode layer, it is possible to suppress the parallelly-oriented expansion of the first electrode layer.

Moreover, the second electrode layer is disposed on one of the opposite surfaces of the current collector. Consequently, the adhesiveness upgrades between the current collector and the second electrode layer whose binder-resin concentration is higher. Therefore, it is possible to suppress the expansion of the first electrode layer by means of the second electrode layer that is firmly bonded onto the current collector. Hence, it is possible to suppress the active material in the first electrode layer from coming off or falling down from the current collector.

It is desirable that the first electrode layer can have a surface that is formed as a rectangular configuration, and that the second electrode layer can be disposed so as to make contact with both side faces of the first electrode layer at a position where it interposes the first electrode layer. In other words, in a case where a surface configuration of the first electrode layer is a rectangle, it is desirable that the second electrode layer can be disposed so as to make contact with at least one of both side faces of the first electrode layer, that is, both longitudinal side faces thereof or both lateral side faces thereof. Since the second electrode layer is thus disposed so as to make contact with both side faces of the first electrode layer at a position where it interposes the first electrode layer, it is possible for the second electrode layer to more inhibit the first electrode layer from expanding parallelly with respect to one of the opposite surfaces.

It is especially desirable that the second electrode layer can be disposed so as to make contact with all side faces of the first electrode layer. Either in a case where a surface of the first electrode layer has a circular configuration, or in the aforementioned case where it has a rectangular configuration, since the second electrode layer is disposed so as to make contact with all side faces of the first electrode layer, it is possible for the second electrode layer to much more inhibit the first electrode layer from expanding parallelly with respect to one of the opposite surfaces.

It is also advisable that the first electrode layer can be a plurality of island-shaped portions or strip-shaped portions that distributes on the current collector. In this instance, it is preferable that the second electrode layer can be disposed so as to bury between the island-shaped portions neighboring one another, or between the strip-shaped portions neighboring one another. By means of providing the first electrode layer and second electrode layer with such configurations and layouts, it is possible to effectively inhibit the first electrode layer from expanding parallelly with respect to one of the opposite surfaces.

It is preferable that the electrode for lithium-ion secondary battery according to the present invention can comprise the second electrode layer that is disposed so as to make contact with a surface of the first electrode layer as well. In addition, it is especially preferable that the first electrode layer can have faces, and all of its faces can be covered with the current collector and the second electrode layer. Since the second electrode layer takes a shape of covering the first electrode layer, it is possible to much more inhibiting the first electrode layer from expanding.

It is also advisable that at least one of the first electrode layer and second electrode layer can have a multi-layered structure comprising a plurality of layers whose binder-resin concentrations differ one another.

It is preferable that the binder-resin concentration in the above-mentioned first electrode layer can be from 1% by mass or more to 20% by mass or less. It is preferable that the binder-resin concentration in the second electrode layer, which is higher than the binder-resin concentration in the first electrode layer, can be more than 1% by mass and 60% by mass or less. By means of setting up such binder-resin concentrations, it is possible to suppress the active material from coming off or falling down from the current collector, and it is possible to make higher-capacity electrodes.

The greater a quantity of the active material in one of the electrode layers that contact with the current collector is, the more advantageous it is in order to make capacities of the resulting electrodes larger. Hence, it is preferable to make a concentration of the active material in the first electrode layer higher than a concentration of the active material in the second electrode layer. When the active-material concentration in the first electrode layer, which is disposed on the current collector alone, is higher, it becomes more advantageous in order to turn the resulting electrodes into higher-capacity ones, in cooperation with the advantageous effect that the second electrode layer inhibits the active material in the first electrode layer from coming off or falling down from the current collector.

Moreover, when the concentration of the active material in the second electrode layer is less than the concentration of the active material in the first electrode layer, volumetric fluctuation magnitudes of the second electrode layer being accompanied by the absorption/release of lithium become smaller compared with volumetric fluctuation magnitudes of the first electrode layer. Consequently, the second electrode layer is kept from coming off from the current collector by means of its own volumetric fluctuations, and hence it is possible to more securely inhibit the first electrode layer from expanding.

It is preferable that this active material can be one kind that is selected from the group consisting of Si, Sn and alloys including Si or Sn. It is possible to make higher-capacity electrodes by means of using these active materials.

It is preferable that the aforementioned binder resin can be one kind that is selected from the group consisting of alkoxy group-containing silane-modified bisphenol type-A epoxy resins, alkoxy group-containing silane-modified novolac-type epoxy resins, alkoxy group-containing silane-modified acrylic resins, alkoxy group-containing silane-modified phenolic resins, alkoxy group-containing silane-modified polyamic acid resins, alkoxy group-containing silane-modified soluble polyimide resins, alkoxy group-containing silane-modified polyurethane resins, and alkoxy group-containing silane-modified polyamide-imide resins. By means of using these binder resins, it is possible to suitably inhibit the active material from coming off or falling down from the current collector.

A manufacturing process for electrode for lithium-ion secondary battery according to the present invention is characterized in that it comprises:

a first electrode-material application step of applying a first slurry, in which a first active material, a first conductive additive and a first binder resin have been mixed one another, onto a surface of a current collector;

a second electrode-material application step of applying a second slurry, in which a second active material, a second conductive additive and a second binder resin have been mixed one another so as to make a binder-resin concentration that is higher than a binder-resin concentration in said first slurry, onto the surface of said current collector at least so as to make contact with the surface of said current collector and at least a side face of said first electrode-material layer; and a curing step of curing said first binder resin and said second binder resin, thereby forming a first electrode layer and a second electrode layer.

By means of setting up such a manufacturing step, it is possible to manufacture an electrode for lithium-ion secondary battery, electrode which exhibits a good cyclability, and electrode in which the active materials are less likely to come off or fall down from one of the opposite surfaces of the current collector.

Effect of the Invention

Therefore, in accordance with the present invention, it is possible to greatly contribute to upgrading electrodes for lithium-ion secondary battery in cyclability.

EXPLANATION ON REFERENCE NUMERALS

Figure 1:
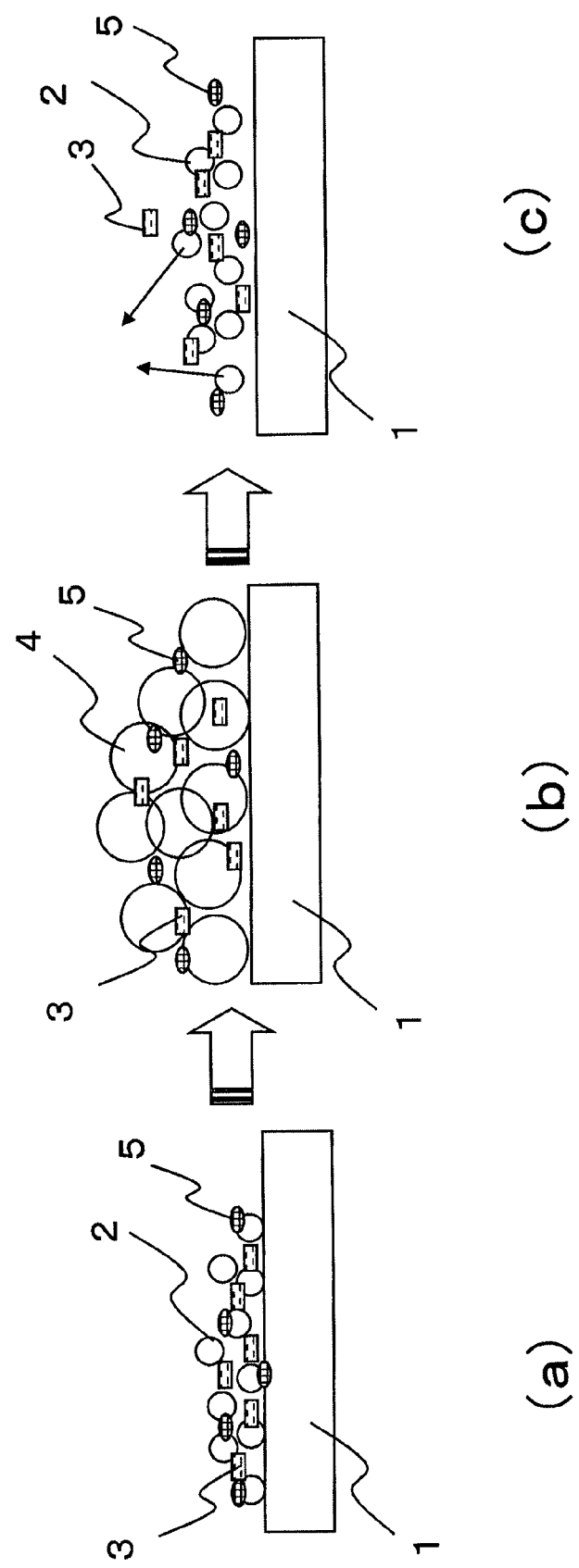
FIG. 1 is an explanatory diagram that explains the falling-down of an active material being accompanied by the absorption/release of lithium.

1: Current Collector; 2: Active Material;
3: Binder; 4: Lithium-absorbed Active Material;
5: Conductive Additive; 6: First Electrode Layer;
7: Second Electrode Layer; 10: Electrodeposited Copper Foil; 11: Paraffin Film;
12: First Slurry; 120: First Electrode-material Layer; 121: First Electrode Layer;
13: Second Slurry; 130: Second Electrode-material Layer; and 131: Second Electrode Layer

BEST MODE FOR CARRYING OUT THE INVENTION

An electrode for lithium-ion secondary battery according to the present invention has a current collector; and an electrode layer that is formed on a surface of the current collector, and which includes a binder resin, an active material and a conductive additive. The electrode layer comprises a first electrode layer, and a second electrode layer whose binder-resin concentration is higher than a binder-resin concentration in the first electrode layer. The first electrode layer is disposed on the surface of the current collector, and the second electrode layer is disposed on the surface of the current collector at least so as to make contact with the surface of the current collector and at least a side face of the first electrode layer.

The "current collector" refers to a chemically-inactive highly-electron-conductive body for keeping electric current flowing to electrodes during discharging or charging. As for a configuration of the current collector, although it can be formed as foil shapes or plate shapes, and the like, it is not limited especially as far as it has a configuration that fits for the objective. It does not matter whether the current collector is provided with irregularities on the surface, or whether holes are opened therein. Copper foils or aluminum foils, and so forth, can be given as the current collector suitably.

The "active material" refers to a substance that contributes directly to electrode reactions, such as charging reactions and discharging reactions. The active material according to the present invention is not at all limited especially.

As a positive-electrode active material, it is possible to use lithium composite oxides, and the like. As a lithium composite oxide, it is possible employ $LiCoO_2$. $LiNiO_2$, $LiMn_2O_4$, $LiNiCoMnO_2$ or $LiFePO_4$, and so forth, for instance. Moreover, as a positive-electrode active material, it is also possible to make it of active materials containing sulfur.

As a negative-electrode active material, it is possible to use lithium, alloys including lithium, or carbon, and the like. In order to make the resulting battery capacity a higher capacity, it is also advisable to make a negative-electrode active material of one kind that is selected from the group consisting of Si or Sn in which lithium can be absorbed and from which it can be released, and alloys including those.

A theoretical capacity of carbon being commonly used for a negative-electrode active material is 372 $mAhg^{-1}$; whereas a theoretical capacity of Si is 4,200 mAhg$^{-1}$, and a theoretical capacity of Sn is 994 mAhg$^{-1}$. Thus, Si and Sn exhibit a high-capacity theoretical capacity, respectively, compared with that of carbon.

However, Si or Sn undergoes a volumetric change being accompanied by the absorption of lithium that is as much as twice or more compared with that of carbon-based material. To be concrete, in the case of Si or Sn, the volume becomes about four times as much as the original volume by means of the absorption of lithium. For the active material, it is possible to employ these active materials independently, or to combine two or more kinds of them to employ. Moreover, for the active material, it is also allowable to use the same type of active material in the first electrode layer and second electrode layer, or it is even permissible to use different active materials in them, respectively.

A conductive additive is added in order to enhance the electric conductivity of the electrode layer. As a conductive additive, it is possible to add the following, namely, carbonaceous fine particles: carbon black, graphite, acetylene black, KETJENBLACK, carbon fibers, and the like, independently, or it is possible to combine two or more kinds of them to add. Moreover, for the conductive additive, it is also allowable to use the same type of conductive additive in the first electrode layer and second electrode layer, or it is even permissible to use different conductive additives in them, respectively.

The binder resin is used as a binding agent for fixing or holding the active material and conductive additive onto the current collector. In order to make the resulting battery capacity a higher capacity, it is required that the binder resin be used in an amount as less as possible. In the present invention, a binder-resin concentration is higher in the second electrode layer than a binder-resin concentration in the first electrode layer. Moreover, it is preferable that the binder-resin concentration in the first electrode layer can be from 1% by mass or more to 20% by mass or less, and it is preferable that the binder-resin concentration in the second electrode layer can be more than 1% by mass and 60% by mass or less.

Moreover, it is more preferable that the binder-resin concentration in the first electrode layer can be from 5% by mass or more to 20% by mass or less, and it is more preferable that the binder-resin concentration in the second electrode layer can be from 10% by mass or more to 60% by mass or less.

Under the condition that a conductive-additive concentration is constant, although an active-material concentration in the second electrode layer comes to lower when a binder-resin concentration in the second electrode layer becomes higher. However, it is even advisable that no active material can be included in the second electrode layer when an active-material concentration in the first electrode layer is high sufficiently.

The binder resin according to the present invention is not at all limited especially. For example, the following can be given: fluoro-based polymers, such as polyvinylidene fluoride (or PVDF) and polytetrafluoroethylene (or PTFE); rubbers, such as styrene-butadiene rubbers (or SBR); imide-based polymers, such as polyimides; alkoxysilyl group-containing resins; and the like.

For the binder resin, it is also allowable to use the same type of binder resin in the first electrode layer and second electrode layer, or it is even permissible to use different binder resins in them, respectively.

Among them, it is preferable that the binder resin can be an alkoxysilyl group-containing resin. For example, alkoxysilyl group-containing resins having a structure that is specified by formula (I) can be given as preferable options.

(Chemical Formula 1)

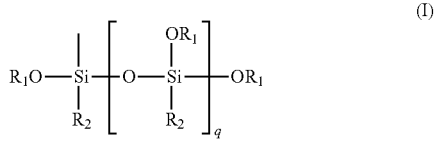

wherein "$R_1$" is an alkyl group whose number of carbon atoms is from 1 to 8;

"$R_2$" is an alkyl group or alkoxyl group whose number of carbon atoms is from 1 to 8; and "q" is an integer of from 1 to 100

The structure that is specified by formula (I) includes a structure that is made of parts having undergone sol-gel reaction, and the alkoxysilyl group-containing resin makes a hybrid composite of resin and silica.

The "structure that is made of parts having undergone sol-gel reaction" is a structure that contributes to reactions in carrying out sol-gel process. The "sol-gel process" is process in which a solution of inorganic or organometallic salt is adapted into a starting solution; and the resulting solution is turned into a colloid solution (Sol) by means of hydrolysis and condensation polymerization reactions. Then, a solid (Gel) that has lost flowability is formed by means of further reacting the resultant colloid solution (Sol) facilitatively.

Because of the fact that the binder resin has a structure that is specified by formula (I), various reactions take place between structures that are made of parts having undergone sol-gel reaction, and between the structures, which are made of parts having undergone sol-gel reaction, and hydroxyl groups in the binder resin, at the time of curing the binder resin. Moreover, because of the fact that the binder resin makes a hybrid composite of resin and silica, it exhibits good adhesiveness to the current collector, one of inorganic materials, as well as to the active material and conductive electrode. Consequently, it is possible for this binder resin to firmly adhere the active material as well as the conductive additive to the current collector.

For a resin that makes a hybrid composite with silica, the following can be given: bisphenol type-A epoxy resins, novolac-type epoxy resins, acrylic resins, phenolic resins, polyamic acid resins, soluble polyimide resins, polyurethane resins, or polyamide-imide resins.

It is possible to make these resins and silica into hybrid composites having a structure that is specified by formula (I), and then they respectively turn into the following: alkoxy group-containing silane-modified bisphenol type-A epoxy resins, alkoxy group-containing silane-modified novolac-type epoxy resins, alkoxy group-containing silane-modified acrylic resins, alkoxy group-containing silane-modified phenolic resins, alkoxy group-containing silane-modified polyamic acid resins, alkoxy group-containing silane-modified soluble polyimide resins, alkoxy group-containing silane-modified polyurethane resins, or alkoxy group-containing silane-modified polyamide-imide resins.

It is possible to synthesize the aforementioned binder resins by means of publicly-known technologies, respectively. Moreover, for the above-mentioned binder resins, it is possible to suitably use commercially-available products.

For example, various commercial products are available as follows: "COMPOCERAN E (product name)" (produced by ARAKAWA CHEMICAL INDUSTRIES, LTD.), one of alkoxy group-containing silane-modified bisphenol type-A epoxy resins or alkoxy group-containing silane-modified novolac-type epoxy resins; "COMPOCERAN AC (product name)" (produced by ARAKAWA CHEMICAL INDUSTRIES, LTD.), one of alkoxy group-containing silane-modified acrylic resins; "COMPOCERAN P (product name)" (produced by ARAKAWA CHEMICAL INDUSTRIES, LTD.), one of alkoxy group-containing silane-modified phenolic resins; "COMPOCERAN H800 (product name)" (produced by ARAKAWA CHEMICAL INDUSTRIES, LTD.), one of alkoxy group-containing silane-modified polyamic acid resins; "COMPOCERAN H700 (product name)" (produced by ARAKAWA CHEMICAL INDUSTRIES, LTD.), one of alkoxy group-containing silane-modified soluble polyimide resins; "UREANO U (product name)" (produced by ARAKAWA CHEMICAL INDUSTRIES, LTD.), one of alkoxy group-containing silane-modified polyurethane resins; or "COMPOCERAN H900 (product name)" (produced by ARAKAWA CHEMICAL INDUSTRIES, LTD.), one of alkoxy group-containing silane-modified polyamide-imide resins.

For example, following (Chemical Formula 2) shows a chemical formula of the basic framework for aforementioned "COMPOCERAN H800 (product name)" (produced by ARAKAWA CHEMICAL INDUSTRIES, LTD.).

Because of the fact that the second electrode layer 7 whose binder-resin concentration is higher is disposed on the surface 1a of the current collector 1, it is possible for the second electrode layer 7 to closely adhere or attach onto the current collector 1. Moreover, the second electrode layer 7 is disposed so as to make contact with the side face 6a of the first electrode layer 6. Even when the first electrode layer 6 is expanded by means of volumetric changes being accompanied by the absorption/release of lithium, the second electrode layer 7 is closely adhered or attached to the surface 1a of the current collector 1, and to the side face 6a of the first electrode layer 6. Consequently, it is possible to suppress the first electrode layer 6 from expanding, due to expansions of the active material within the first electrode layer 6, in parallel directions with respect to the opposite surfaces. Thus, it is possible to inhibit the active materials in the first electrode layer 6 as well as in the second electrode layer 7 from coming off or falling down from the current collector 1. Note that it is possible to more securely suppress the first electrode layer 6 from expanding in the parallel directions when adopting such a constitution that another side face, which is opposite to the side face 6a of the first electrode layer 6, comes in contact with another component part.

(Chemical Formula 2)

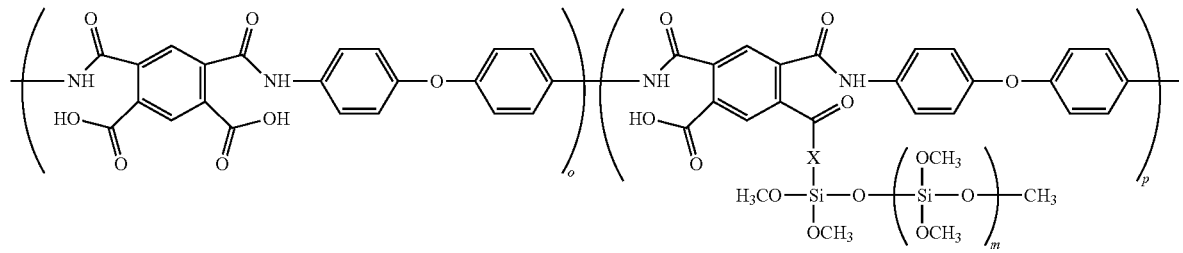

"COMPOCERAN H800"

In an electrode for lithium-ion secondary battery according to the present invention, a first electrode layer is disposed on one of the opposite surfaces of a current collector, and a second electrode layer is disposed on the opposite surface of the current collector at least so as to make contact with the opposite surface of the current collector and at least a side face of the first electrode layer. As being aforementioned, a binder-resin concentration in the second electrode layer is higher than a binder-resin concentration in the first electrode layer.

Figure 2:
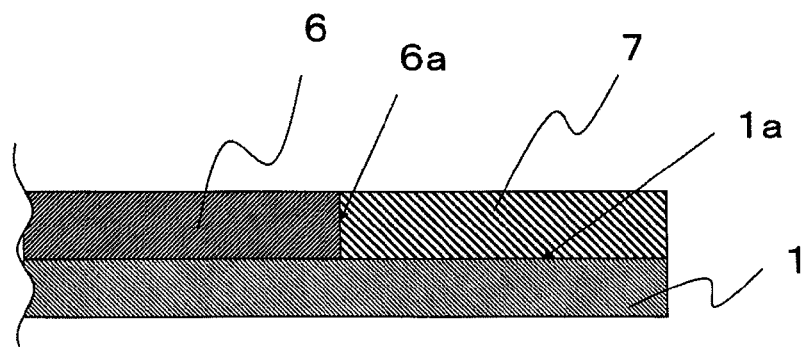
FIG. 2 is a partially-cross-sectional schematic diagram that illustrates a first electrode layer and a second electrode layer that are disposed on a current collector.

FIG. 2 shows a partial cross-sectional schematic diagram that illustrates a first electrode layer 6 and a second electrode layer 7 that are disposed on a current collector 1. Note that the cross-sectional diagram in FIG. 2 shows a perpendicular cross-sectional diagram with respect to a surface of the current collector. This also holds true similarly for cross-sectional diagrams in FIG. 3A, FIG. 3B, FIG. 3C, FIG. 4(b), FIG. 8A, FIG. 8B, FIG. 8C, FIG. 9A, FIG. 9B, FIG. 9C, FIG. 9D, FIG. 9E, FIG. 10A and FIG. 10B, respectively. As illustrated in FIG. 2, the first electrode layer 6 is disposed on one of the opposite surfaces of the current collector 1. The second electrode layer 7 is disposed so as to make contact with at least a side face 6a of the first electrode layer 6 and a surface 1a of the current collector 1. Although the electrode layers are disposed on one of the opposite surfaces of the current collector 1 in FIG. 2, it is even advisable that the electrode layers can be disposed on both opposite surfaces of the current collector 1.

Figure 3A:
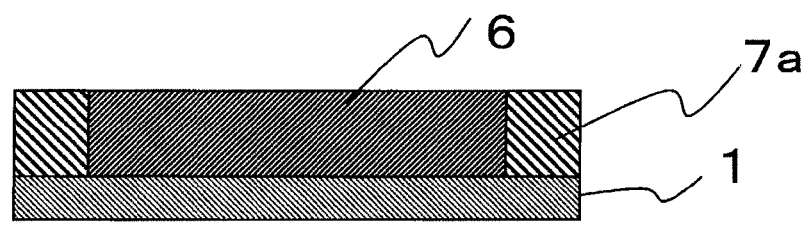
FIG. 3A is a cross-sectional schematic diagram that illustrates a first electrode layer and a second electrode layer that are disposed on a current collector.
Figure 3B:
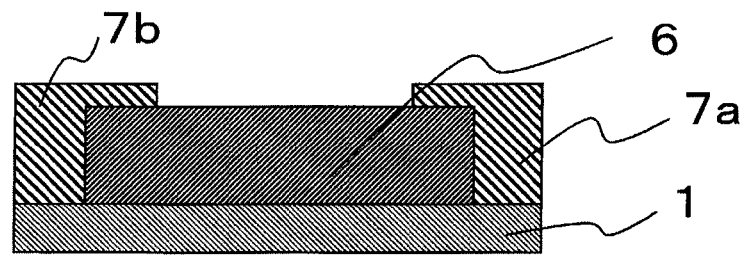
FIG. 3B is a cross-sectional schematic diagram that illustrates a first electrode layer and a second electrode layer that are disposed on a current collector.
Figure 3C:
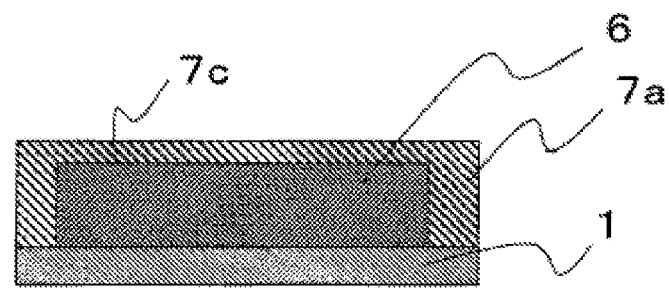
FIG. 3C is a cross-sectional schematic diagram that illustrates a first electrode layer and a second electrode layer that are disposed on a current collector.

Moreover, each of FIG. 3A, FIG. 3B and FIG. 3C shows a cross-sectional schematic diagram that illustrates a first electrode layer 6 and a second electrode layer 7 that are disposed on a current collector 1. In FIG. 3A, FIG. 3B and FIG. 3C, the first electrode layer 6 is disposed so that it has opposite surfaces being formed as a rectangular configuration, and the second electrode layer 7 is disposed on one of the opposite surfaces of the current collector 1 at least so that it makes contact with both side faces of the first electrode layer 6 at a position where it interposes the first electrode layer 6. Moreover, in FIG. 3A, FIG. 3B and FIG. 3C, the first electrode layer 6, whose longitudinal length is identical to that of the current collector 1 and whose lateral length is shorter than that of the current collector 1, is disposed on the current collector 1 with a rectangular configuration, in which the lateral length is longer than the longitudinal length, when being viewed from the current-collector side. In addition, the second electrode layer 7, which extends in a strip shape longitudinally, is disposed at the lateral opposite ends of the current collector 1.

FIG. 3A shows an example in which the second electrode layer 7 is disposed so as to make contact with both opposite side faces of the first electrode layer 6. Since side-face portions 7a of the second electrode layer 7 are disposed on both opposite side faces of the first electrode layer 6, it is possible to much more suppress the first electrode layer 6 more from expanding in the parallel directions.

FIG. 3B shows an example in which the second electrode layer 7 makes contact with both side faces of the first electrode layer 6, and in which the second electrode layer 7 is disposed on one of the opposite surfaces of the first electrode layer 6 partially as well. As illustrated in FIG. 3B, side-face portions 7a of the second electrode layer 7 are disposed on both opposite side faces of the first electrode layer 6, and shoulder portions 7b of the second electrode layer 7 are disposed so as to make contact with the opposite surface of the first electrode layer 6 partially. The aforementioned side-face portions 7a and shoulder portions 7b are formed integrally. Since the second electrode layer 7 is constituted as aforementioned, it is possible to much more suppress the first electrode layer 6 from expanding in the parallel directions and partially in the perpendicular directions.

FIG. 3C shows an example in which the second electrode layer 7 makes contact with both side faces of the first electrode layer 6, and in which the second electrode layer 7 is disposed on one of the opposite surfaces of the first electrode layer 6 entirely as well. As illustrated in FIG. 3C, side-face portions 7a of the second electrode layer 7 are disposed on both opposite side faces of the first electrode layer 6, and a ceiling portion 7c of the second electrode layer 7 is disposed so as to make contact with the opposite surface of the first electrode layer 6 entirely. In FIG. 3C, the first electrode layer 6 has four faces, that is, both of the right and left side faces and both of the top and bottom faces, which are covered with the current collector 1 and second electrode layer 7. Since the second electrode layer 7 is constituted as aforementioned, it is possible to suppress the first electrode layer 6 from expanding in the parallel directions and perpendicular directions with respect to the opposite surface of the first electrode layer 6.

As illustrated in FIG. 3B and FIG. 3C, due to the fact that the second electrode layer 7 is disposed partially or entirely on one of the opposite surfaces of the first electrode layer 6, it is possible to suppress perpendicularly-oriented expansions as well with respect to the opposite surface of the first electrode layer 6, in addition to suppressing parallelly-oriented expansions with respect to the opposite surface of the first electrode layer 6. Consequently, it is possible to further inhibit the active material in the first electrode layer 6 from coming off or falling down from the current collector 1. Note that, although the examples, which have been explained in FIG. 3A, FIG. 3B and FIG. 3C, are those in which the second electrode layer 7 is disposed on both right and left sides of the first electrode layer 6, it is allowable that the second electrode layer 7 can be disposed on at least one of the both longitudinal side faces and both lateral side faces of the first electrode layer 6, and even such a case is permissible naturally in which the second electrode layer 7 can make contact with both of the two longitudinal side faces and two lateral side faces.

Figure 4:
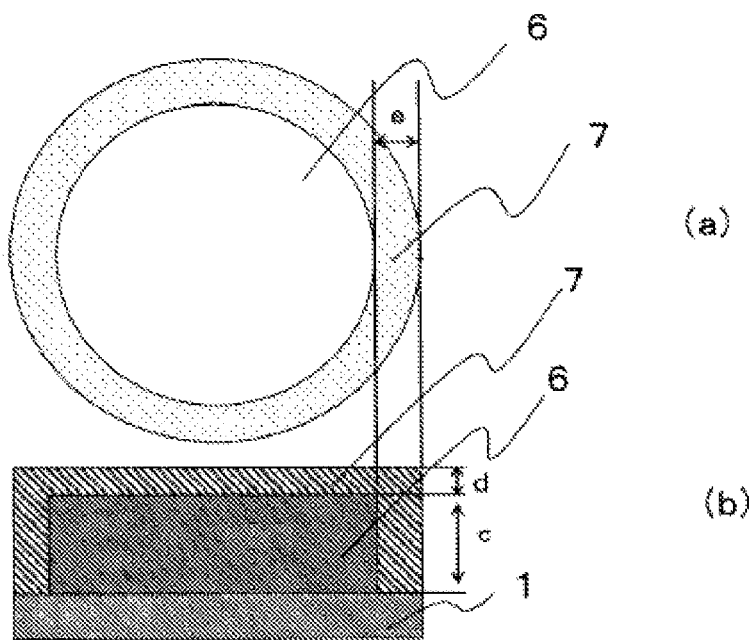
FIG. 4 is across-sectional schematic diagram that illustrates a first electrode layer and a second electrode layer that are disposed on a current collector, and is a schematic diagram in which the first electrode layer and second electrode layer are viewed from the current-collector side.

FIG. 4 shows a cross-sectional schematic diagram, which illustrates a first electrode layer and a second electrode layer that are disposed on a current collector, and a schematic diagram, in which the first electrode layer and second electrode layer are viewed from the current-collector side. In FIG. 4(b), the cross-sectional schematic diagram, which illustrates the first electrode layer and second electrode layer being disposed on the current collector, is shown; in FIG. 4(a), the schematic diagram, in which the first electrode layer and second electrode layer are viewed from the current-collector side, is shown.

In FIG. 4(a), a layout diagram is shown in which a first electrode layer 6 and a second electrode layer 7 are disposed on a surface of a disk-shaped current collector whose opposite surfaces are formed respectively as a circular configuration. In the example shown in FIG. 4(a), the first electrode layer 6 is disposed as a circle concentrically with the center of the current collector 1, whereas the second electrode layer 7 is disposed as a concentrically-circular doughnut (or ring) configuration so that it surrounds around the first electrode layer 6 when being viewed from the current-collector side. Moreover, the second electrode layer 7 is disposed on one of the opposite surfaces of the first electrode layer 6 entirely.

As can be seen from FIG. 4(b), a thickness "d," which the second electrode layer 7 has at a portion where it is formed on the opposite surface of the first electrode layer 6, becomes thinner than a thickness "c" of the first electrode layer 6. Moreover, as illustrated in FIG. 4(a), a width "e," which the second electrode layer 7 has at its doughnut-like configured portion, becomes smaller than the radius of the first electrode layer 6. The width "e" is not limited especially in its magnitude. It is possible to appropriately determine the magnitude of the width "e" in compliance with the binder-resin concentration in the second electrode layer 7. It is even advisable that, the more concentrated the binder-resin concentration in the second electrode layer 7 is, the smaller the width "e" can be set in the magnitude.

As can be seen from FIG. 4(a) and FIG. 4(b), in a case where one of the opposite surfaces of the current collector 1 has a circular configuration, it is preferable to dispose the second electrode layer 7 as a ring configuration entirely on the outer-peripheral side faces (or all the side faces) of the first electrode layer 6 that is disposed as a circular configuration. It is possible to suppress parallelly-oriented expansions with respect to one of the opposite surfaces of the first electrode layer by means of such an arrangement, because the second electrode layer 7 is disposed in all directions in the parallelly-oriented expansions with respect to the opposite surface of the first electrode layer 6.

It is possible to dispose the first electrode layer and second electrode layer as various configurations on current collectors in compliance with the current collectors' configurations.

Hereinafter, examples on how to dispose a first electrode layer and a second electrode layer onto a current collector will be explained using FIG. 5A, FIG. 5B, FIG. 5C, FIG. 5D, FIG. 6A, FIG. 6B, FIG. 6C, FIG. 7A and FIG. 7B. The present invention is not one which is limited to examples being explained hereinafter, but it is possible to execute the present invention in various modes while changing it variously within a range not departing from the gist.

Each of FIG. 5A, FIG. 5B, FIG. 5C and FIG. 5D shows a schematic layout diagram that illustrates a first electrode layer and a second electrode layer that are disposed onto a rectangular current collector. In the example shown in FIG. 5A, a first electrode layer 6, whose longitudinal length is the same as that of a current collector and whose lateral length is shorter than that of the current collector, is disposed on the current collector with a rectangular configuration, in which the lateral length is longer than the longitudinal length. In addition, the second electrode layer 7, which extends in a strip shape longitudinally, is disposed at the lateral opposite ends of the current collector. On this occasion, the second electrode layer 7 comes to be disposed so as to make contact with both side faces of the first electrode layer 6 at a position where it interposes the first electrode layer 6.

Figure 5A:
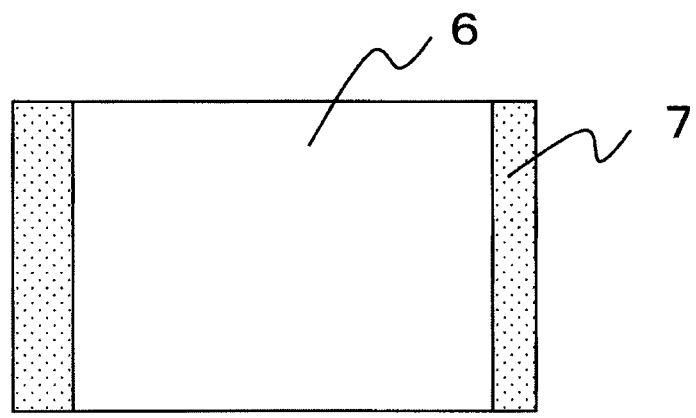
FIG. 5A is a schematic layout diagram in which a first electrode layer and a second electrode layer are disposed onto a rectangular current collector.

The structure shown in FIG. 5A can be easily manufactured by a continuous coating machine. Moreover, in addition to the structure shown in FIG. 5A, the following, like the structures shown in FIG. 5B, FIG. 5C and FIG. 5D, can be easily manufactured by a continuous coating machine as well: those having a structure in which the first electrode layer 6, whose lateral length is shorter than that of the current collector, is disposed, and in which the second electrode layer 7, which extends as a strip shape in one of the longitudinal directions of the current collector, is disposed; and those having another structure in which the first electrode layer 6, whose longitudinal length is shorter than that of the current collector, is disposed, and in which the second electrode layer 7, which extends as a strip shape in one of the lateral directions of the current collector, is disposed.

Figure 5B:
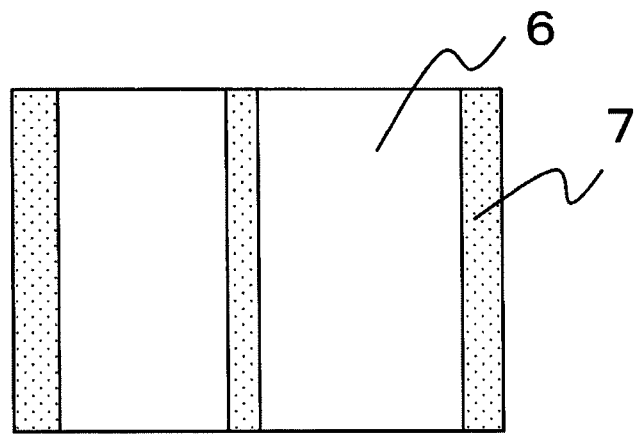
FIG. 5B is a schematic layout diagram in which a first electrode layer and a second electrode layer are disposed onto a rectangular current collector.
Figure 5C:
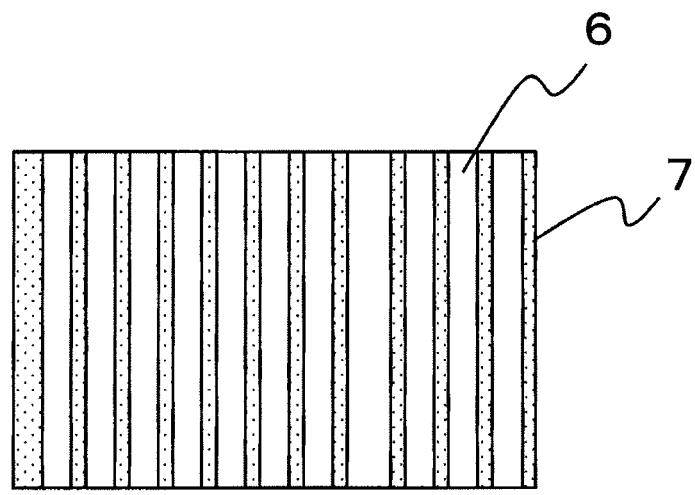
FIG. 5C is a schematic layout diagram in which a first electrode layer and a second electrode layer are disposed onto a rectangular current collector.
Figure 5D:
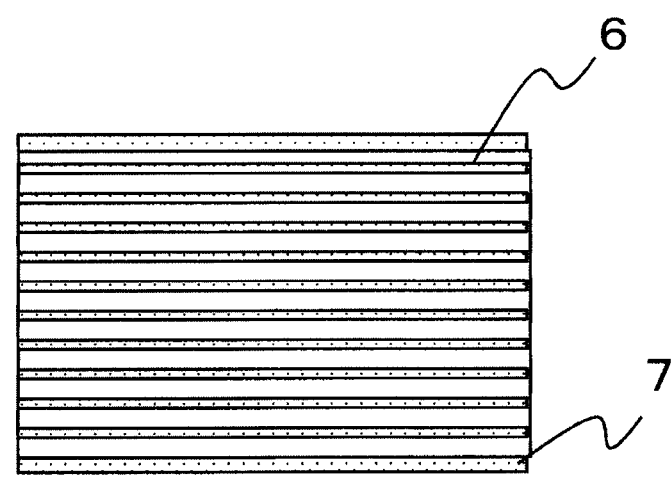
FIG. 5D is a schematic layout diagram in which a first electrode layer and a second electrode layer are disposed onto a rectangular current collector.

In the example shown in FIG. 5B, a first electrode layer 6 is disposed on a current collector, and second electrode layers 7, which extend as a strip shape longitudinally, are disposed at the lateral opposite ends of the current collector and at the center. In the example shown in FIG. 5C, a first electrode layer 6, and a second electrode layer 7 are disposed alternately in a longitudinally-striped pattern. In FIG. 5D, a first electrode layer 6, and a second electrode layer 7 are disposed alternately in a laterally-striped pattern.

In FIG. 5 C and FIG. 5D, the first electrode layer and second electrode layer 7 comprise a plurality of strip-shaped portions, respectively; and each of the strip-shaped portions in the second electrode layer 7 is disposed so as to bury between the strip-shaped portions neighboring one another in the first electrode layer 6.

In FIG. 5B, FIG. 5 C and FIG. 5D, the first electrode layers 6, and the second electrode layers 7 make a striped pattern. In such a structure, the current collector is less likely to be affected as a whole by expansions of the first electrode layers 6 even when the size of the current collector enlarges, because it is possible for each of the second electrode layers 7 to inhibit each of the first electrode layers 6 from expanding parallelly with respect to one of the opposite surfaces.

Figure 6A:
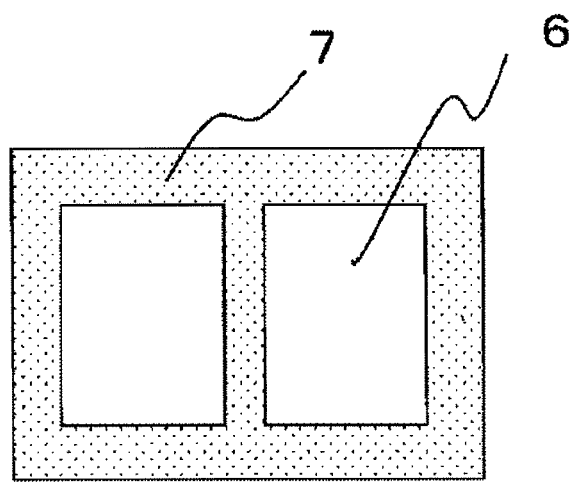
FIG. 6A is a schematic layout diagram in which a first electrode layer and a second electrode layer are disposed on a current collector.
Figure 6B:
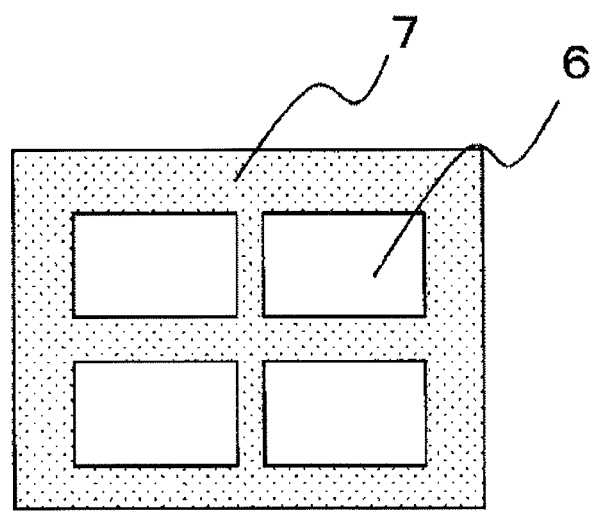
FIG. 6B is a schematic layout diagram in which a first electrode layer and a second electrode layer are disposed on a current collector.
Figure 6C:
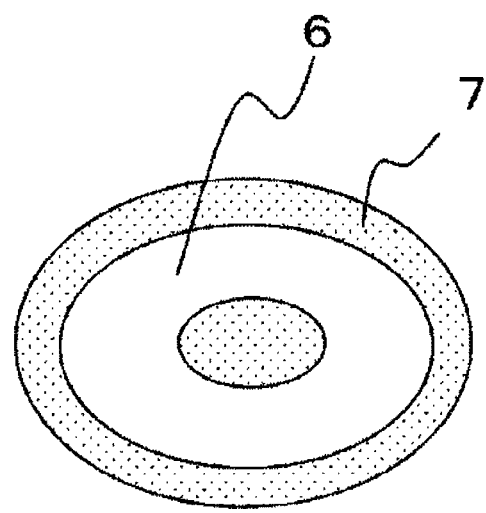
FIG. 6C is a schematic layout diagram in which a first electrode layer and a second electrode layer are disposed on a current collector.

Each of FIG. 6A, FIG. 6B and FIG. 6C shows another schematic layout diagram that illustrates a first electrode layer and a second electrode layer that are disposed onto a current collector. In the example shown in FIG. 6A, two rectangle-shaped first electrode layers 6 are disposed on a current collector with a rectangular configuration, in which the lateral length is longer than the longitudinal length; and a second electrode layer 7 is disposed as a quadrangle-framed shape at the peripheral rim of the current collector so that it covers all of the side faces in each of the first electrode layers 6; and another second electrode layer 7, which extends in a strip shape longitudinally, is disposed at the middle. In the example shown in FIG. 6B, a second electrode layer 7, which comprises a quadrangle-framed portion and a cross-shaped portion being disposed in the former, is disposed so as to cover all of the side faces in four rectangle-shaped first electrode layers 6.

In the example shown in FIG. 6C, a first electrode layer 6 is disposed as a doughnut configuration on a current collector with an elliptic configuration. Moreover, not only a circular second electrode layer 7 is disposed at the middle of the current collector so that it covers all of the side faces in the first electrode layer 6, but also another second electrode layer 7 with a doughnut configuration is disposed at the peripheral rim of the current collector.

As can be seen from FIG. 6A and FIG. 6B, it is possible for the second electrode layer 7, which is disposed around each of the segmented first electrode layers 6, to inhibit the first electrode layers 6 respectively from expanding parallelly with respect to one of their opposite surfaces by means of dividing the first electrode layer 6 into segments and then disposing the second electrode layer 7 around each of the segmented first electrode layers 6.

Figure 7A:
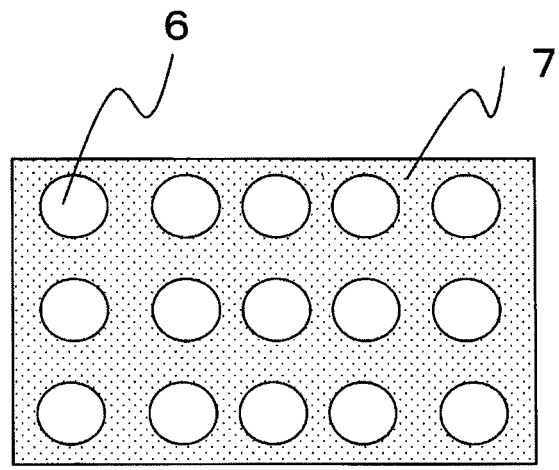
FIG. 7A is a schematic layout diagram in which a first electrode layer and a second electrode layer are disposed in a sea-island-shaped manner on a rectangular current collector.
Figure 7B:
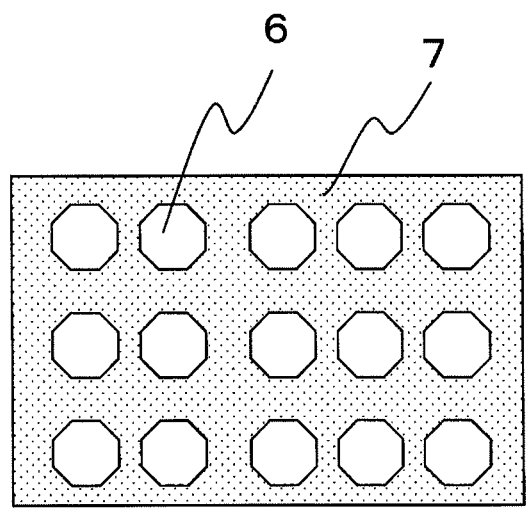
FIG. 7B is a schematic layout diagram in which a first electrode layer and a second electrode layer are disposed in a sea-island-shaped manner on a rectangular current collector.

Each of FIG. 7A and FIG. 7B shows a schematic layout diagram that illustrates a first electrode layer and a second electrode layer that are disposed as a shape of sea-islands on a rectangular current collector. In the example shown in FIG. 7A, a plurality of first electrode layers 6 are disposed so that they are distributed as a shape of circular islands, and a second electrode layer 7 is disposed so as to bury between the island-shaped portions neighboring one another. In the example shown in FIG. 7B, a plurality of first electrode layers 6 are disposed so that they are distributed as a shape of octagonal islands, and a second electrode layer 7 is disposed so as to bury between the island-shaped portions neighboring one another. To put it differently, in the examples shown in FIG. 7A and FIG. 7B, the second electrode layer 7 is disposed continuously on all parts in one of the opposite surfaces of the current collector entirely, other than the parts on which the first electrode layers 6 are disposed.

By means of disposing the first electrode layer 6 and second electrode layer 7 onto a current collector as illustrated in FIG. 5A, FIG. 5B, FIG. 5C, FIG. 5D, FIG. 6A, FIG. 6B, FIG. 6C, FIG. 7A and FIG. 7B, it is possible to suppress the first electrode layer 6 from expanding parallelly with respect to one of the opposite surfaces by means of the second electrode layer 7 even when the first electrode layer 6 expands by means of volumetric changes that are accompanied by the absorption/release of lithium. Consequently, it is possible to inhibit the active material in the first electrode layer 6 from coming off or falling down from the current collector. Moreover, since the binder-resin concentration is high in the second electrode layer 7 compared with that in the first electrode layer 6, the active material is less likely to come off or fall down from the current collector.

Moreover, it is possible for the first electrode layer and second electrode layer, which are to be disposed on current collectors, to have various cross-sectional configurations. FIG. 8A, FIG. 8B, FIG. 8C, FIG. 9A, FIG. 9B, FIG. 9C, FIG. 9D, FIG. 9E, FIG. 10A, and FIG. 10B show examples on cross-sectional configurations of the first electrode layer and second electrode layer, respectively. As being aforementioned, the present invention is not one which is limited to examples being explained hereinafter, but it is possible to execute the present invention in various modes while changing it variously within a range not departing from the gist.

Figure 8A:
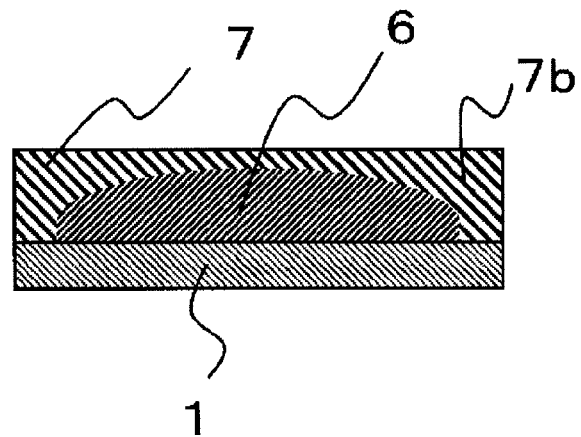
FIG. 8A is a cross-sectional schematic diagram that illustrates a cross-sectional configuration of a first electrode layer and that of a second electrode layer, the first electrode layer and second electrode layer being disposed on a current collector.
Figure 8B:
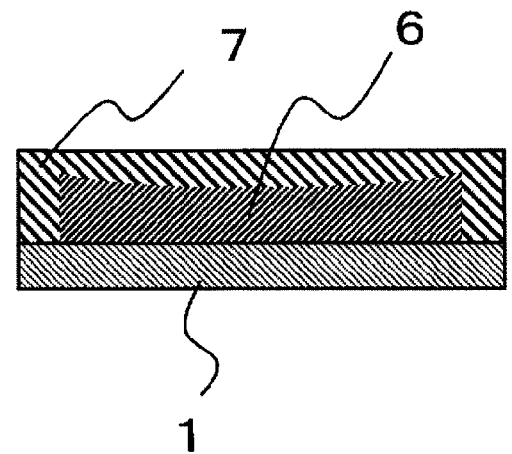
FIG. 8B is a cross-sectional schematic diagram that illustrates a cross-sectional configuration of a first electrode layer and that of a second electrode layer, the first electrode layer and second electrode layer being disposed on a current collector.
Figure 8C:
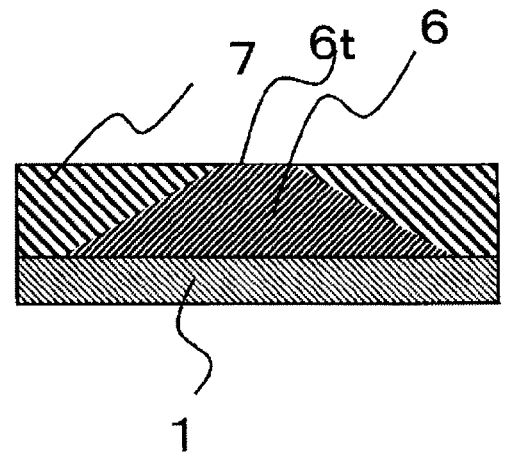
FIG. 8c is a cross-sectional schematic diagram that illustrates a cross-sectional configuration of a first electrode layer and that of a second electrode layer, the first electrode layer and second electrode layer being disposed on a current collector.

Each of FIG. 8A, FIG. 8B and FIG. 8C shows a cross-sectional schematic diagram that illustrates a cross-sectional configuration between a first electrode layer and a second electrode layer that are disposed on a current collector. In the example shown in FIG. 8A, a first electrode layer 6 with a cross-sectional configuration, which makes an upward-convex-shaped configuration that is linear on the current-collector side and is semi-elliptic on the opposite side, is disposed on a current collector 1; and a second electrode layer 7 is disposed on the first electrode layer 6 and current collector 1 so that it covers exposed surfaces of the first electrode layer 6 entirely. In a case of the configuration being shown in FIG. 8A, it is possible to much more relax or alleviate stresses that arise from the expanding first electrode layer 6, because the amount of shoulder portions 7b of the second electrode layer 7, which are in contact with the shoulders of the first electrode layer 6, becomes greater.

In the example shown in FIG. 8B, a first electrode layer 6 is disposed on a current collector 1 as a cross-sectional configuration that is linear on the current-collector side, and which makes an upward-concave-shaped configuration on the opposite side; and a second electrode layer 7 is disposed on the first electrode layer 6 and current collector 1 so that it covers exposed surfaces of the first electrode layer 6 entirely.

In the example shown in FIG. 8C, a first electrode layer 6, whose cross-sectional configuration is a trapezoidal configuration, is disposed on a current collector 1; and a second electrode layer 7 is disposed on the first electrode layer 6 and current collector 1 so that it covers exposed surfaces of the first electrode layer 6 partially. In the example shown in FIG.

8C, although the second electrode layer 7 is not at all disposed on the top 6t of the first electrode layer 6 that corresponds to the upper base in the trapezoidal configuration, it is also advisable that the second electrode layer 7 can be disposed on the top 6t of the first electrode layer 6. As illustrated in the examples shown in FIG. 8B and FIG. 8C, regardless of the configurations of the first electrode layer 6, it is possible for the second electrode layer 7 to suppress the first electrode layer 6 from expanding. In the examples shown in FIG. 8A, FIG. 8B and FIG. 8C, the planar configurations of the first electrode layer 6 and second electrode layer 7 are not at all limited especially.

Each of FIG. 9A, FIG. 9B, FIG. 9C, FIG. 9D and FIG. 9E shows another cross-sectional schematic diagram that illustrates a cross-sectional configuration between a first electrode layer and a second electrode layer that are disposed on a current collector. In the example shown in FIG. 9A, a first electrode layer 6, whose cross-sectional configuration is a rectangular configuration, is disposed at two locations, between which an interval is provided, on a current collector 1; and a second electrode layer 7 is disposed on the first electrode layer 6 and current collector 1 so that it covers exposed surfaces of the first electrode layer 6, which is disposed respectively at the two locations, entirely.

Figure 9A:
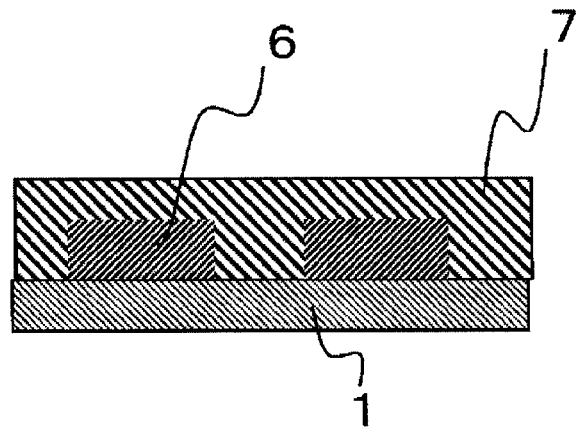
FIG. 9A is another cross-sectional schematic diagram that illustrates a cross-sectional configuration of a first electrode layer and that of a second electrode layer, the first electrode layer and second electrode layer being disposed on a current collector.
Figure 9B:
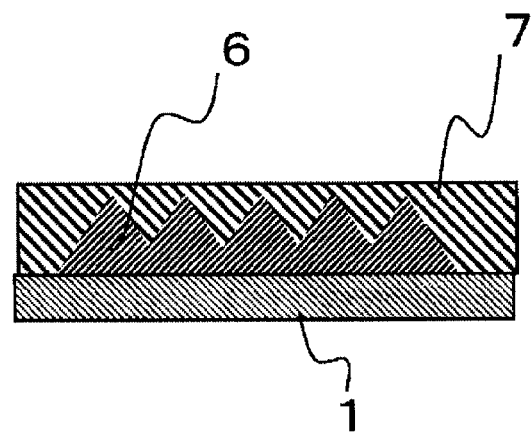
FIG. 9B is another cross-sectional schematic diagram that illustrates a cross-sectional configuration of a first electrode layer and that of a second electrode layer, the first electrode layer and second electrode layer being disposed on a current collector.

In the example shown in FIG. 9B, a first electrode layer 6 is disposed on a current collector 1 as a cross-sectional configuration that is linear on the current-collector side, and which makes an upward-saw-toothed configuration on the opposite side; and a second electrode layer 7 is disposed on the first electrode layer 6 and current collector 1 so that it covers exposed surfaces of the first electrode layer 6 entirely. In the example shown in FIG. 9C, a first electrode layer 6 is disposed on a current collector 1 as a cross-sectional configuration, which is linear on the current-collector side and which makes an upward-corrugated configuration, on the opposite side, upward-corrugated configuration in which a plurality of semicircles are lined up laterally so that they overlap one another in order to make upward convexes; and a second electrode layer 7 is disposed on the first electrode layer 6 and current collector 1 so that it covers exposed surfaces of the first electrode layer 6 entirely.

Figure 9C:
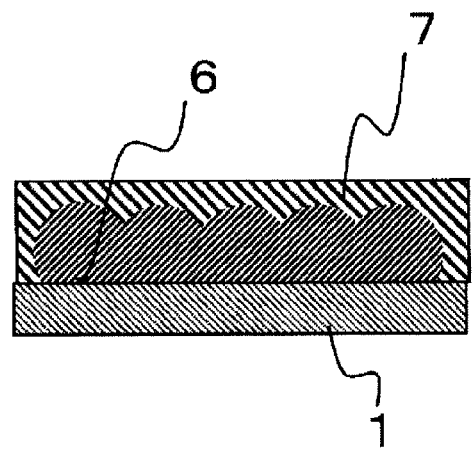
FIG. 9C is another cross-sectional schematic diagram that illustrates a cross-sectional configuration of a first electrode layer and that of a second electrode layer, the first electrode layer and second electrode layer being disposed on a current collector.

In accordance with the cross-sectional configurations of the first electrode layer 6 as illustrated in FIG. 9B and FIG. 9C, it is possible to augment the contact area between the first electrode layer 6 and the second electrode layer 7. When the contact area between the two electrode layers augments, it is possible to much more inhibit the first electrode layer 6 from coming off or falling down from the current collector 1.

Figure 9D:
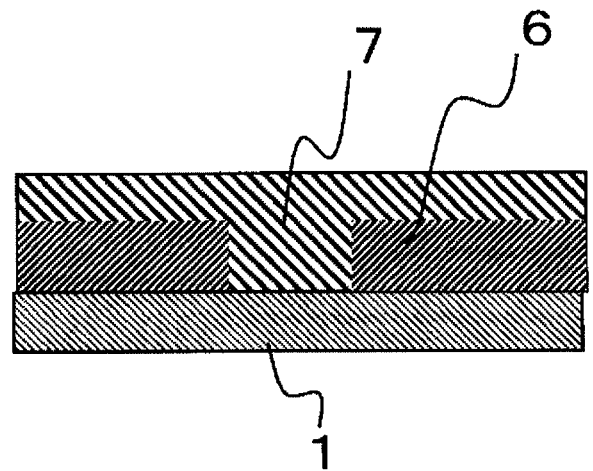
FIG. 9D is another cross-sectional schematic diagram that illustrates a cross-sectional configuration of a first electrode layer and that of a second electrode layer, the first electrode layer and second electrode layer being disposed on a current collector.

In the example shown in FIG. 9D, a first electrode layer 6, whose cross-sectional configuration is a rectangular configuration, is disposed at two locations, between which an interval is provided, on a current collector 1. A second electrode layer 7 is disposed partially on some of the side faces of the first electrode layer 6 that is disposed respectively at two locations, that is, the second electrode layer 7 is disposed so as to bury between the respective first electrode layers 6. Moreover, the second electrode layer 7 is disposed on the first electrode layer 6 and current collector 1. In the example shown in FIG. 9D, the side faces of the first electrode layers 6 are provided with places on which the second electrode layer 7 is not disposed at all.

Note that it is possible to more securely suppress the first electrode layers 6 from expanding in the parallel directions when adopting such a constitution that the other side faces of the first electrode layers 6, which are opposite to the side faces of the first electrode layers 6 on which the second electrode layer 7 is disposed, come in contact with another component part.

Figure 9E:
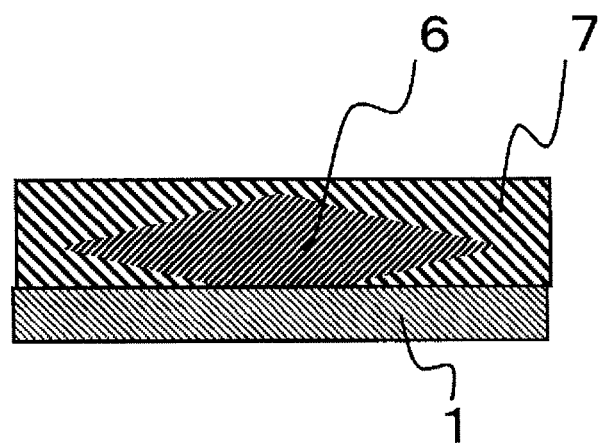
FIG. 9E is another cross-sectional schematic diagram that illustrates a cross-sectional configuration of a first electrode layer and that of a second electrode layer, the first electrode layer and second electrode layer being disposed on a current collector.

In the example shown in FIG. 9E, a first electrode layer 6 having a configuration, whose cross-sectional configuration is a diamond shape being cut off partially, is disposed on a current collector 1; and a second electrode layer 7 is disposed on the first electrode layer 6 and current collector 1 so that it covers exposed surfaces of the first electrode layer 6 entirely.

As illustrated in FIG. 8A, FIG. 8B, FIG. 8C, FIG. 9A, FIG. 9B, FIG. 9C, FIG. 9D and FIG. 9E, the cross-sectional configuration of the first electrode layer 6 is not at all limited especially, but it is advisable that the second electrode layer 7 can be disposed so as to make contact with at least one of the side faces of the first electrode layer 6.

Figure 10A:
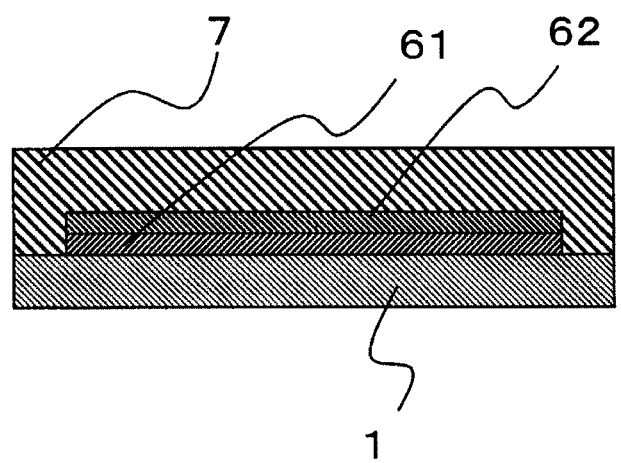
FIG. 10A is a cross-sectional schematic diagram that illustrates a first electrode layer that has a multi-layered structure, and a second electrode layer, the first electrode layer and second electrode layer being disposed on a current collector.
Figure 10B:
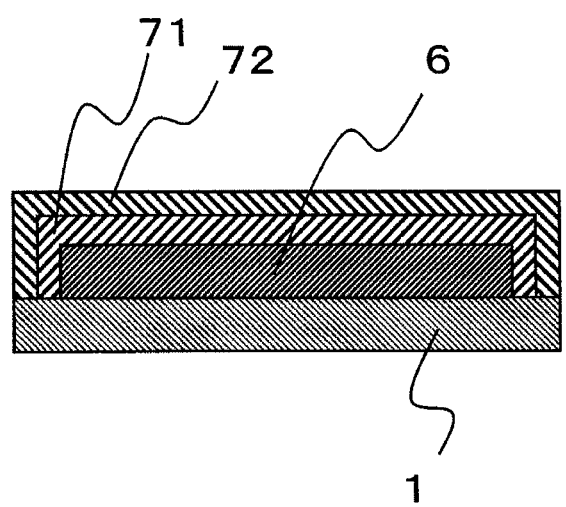
FIG. 10B is a cross-sectional schematic diagram that illustrates a first electrode layer, and a second electrode layer that has a multi-layered structure, the first electrode layer and second electrode layer being disposed on a current collector.

Each of FIG. 10A and FIG. 10B shows a cross-sectional schematic diagram that illustrates a cross-sectional configuration between a first electrode layer and a second electrode layer that are disposed on a current collector, and one of which has a multi-layered structure. In the example shown in FIG. 10A, a lower-side first electrode layer 61, and an upper-side first electrode layer 62 are disposed in this order on a current collector 1; and a second electrode layer 7 is disposed on the upper-side first electrode layer 62 and current collector 1 so that it covers exposed surfaces of the lower-side first electrode layer 61 and the upper-side first electrode layer 62 entirely. A binder-resin concentration in the upper-side first electrode layer 62 is a higher concentration than a binder-resin concentration in the lower-side first electrode layer 61.

In the example shown in FIG. 10B, a first electrode layer 6 is disposed on a current collector 1; an inner-side second electrode layer 71 is disposed on the first electrode layer 6 and current collector 1 so that it covers exposed surfaces of the first electrode layer 6 entirely; and an outer-side second electrode layer 72 is further disposed on the inner-side second electrode layer 71 and current collector 1 so that it covers exposed surfaces of the inner-side second electrode layer 71 entirely. A binder-resin concentration in the outer-side second electrode layer 72 is a higher concentration than a binder-resin concentration in the inner-side second electrode layer 71.

In an electrode layer, when the active-material concentration is made higher while keeping the conductive-additive concentration constant, the binder-resin concentration becomes lower inevitably in that electrode layer. When providing the first electrode layer 6 with a multi-layered structure comprising a plurality of layers as set forth above, and making a binder-resin concentration in the upper-side first electrode layer 62 a higher concentration than a binder-resin concentration in the lower-side first electrode layer 61 that has the same extent of conductive-additive concentration as that in the upper-side first electrode layer 62, it is possible to dispose a layer with a much less binder-resin concentration, that is, the lower-side first electrode layer 61, a layer being concentrated more in the active-material concentration, on one of the opposite surfaces of the current collector 1. In this way, since it is possible to dispose an active material with a high concentration at locations that are much nearer to a current collector, it is possible to make the resulting battery capacity a higher capacity. Moreover, when providing the second electrode layer 7 with a multi-layered structure comprising a plurality of layers, and making a binder-resin concentration in the outer-side second electrode layer 72 a higher concentration than a binder-resin concentration in the inner-side second electrode layer 71, it is possible to dispose the inner-side second electrode layer 71, whose binder-resin concentration approximates a binder-resin concentration in the first electrode layer 6, on one of the opposite surfaces of the first electrode layer 6. Consequently, it is possible to much more enhance the adhesiveness between the first electrode layer 6 and the inner-side second electrode layer 71. Moreover, since a binder-resin concentration in the outer-side second electrode layer 72, the outermost layer becomes a higher concentration, it is possible to more securely suppress the first electrode layer 6 from expanding.

Although FIG. 10A and FIG. 10B show examples in which either a first electrode layer or a second electrode layer is provided with a two-layered structure, it is advisable that both first electrode layer and second electrode layer can be respectively provided with a two-layered structure, or at least one of the two electrode layers can be provided with a multi-layered structure of three or more layers. On this occasion, a binder-resin concentration in a constituent layer, which has the minimum concentration in the binder-resin concentrations in the constituent layers of the second electrode layer, is a higher concentration than a binder-resin concentration in another constituent layer, which has the maximum concentration in the binder-resin concentrations in the constituent layers of the first electrode layer.

Moreover, it is preferable that binder-resin concentrations in the respective layers, which constitute the multi-layered structure as aforementioned, can differ one another, and it is more preferable that the binder-resin concentrations can become more concentrated as the constituent layers get away from those which are nearer to a current collector. That is, it is preferable that the binder-resin concentration in the outermost layer can be the maximum. In addition, it is also advisable to provide a first electrode layer or a second electrode layer with a single-layered structure in which the binder-resin concentration makes a gradient concentration that becomes higher gradually as getting away from a current collector. By means of setting up a gradient concentration, a difference between binder-resin concentrations can be made less between the first electrode layer and the second electrode layer disposed on the first electrode layer at an interface in the laminated section between the two, and thereby the adhesiveness between the first electrode layer and the second electrode layer can be made stronger at that interface. Consequently, it possible to much more suppress the resulting electrode layer from undergoing volumetric changes as a whole.

A manufacturing process for electrode for lithium-ion secondary battery according to the present invention is characterized in that it comprises:

a first application step of applying a first slurry, in which a first active material, a first conductive additive and a first binder resin have been mixed one another, onto a surface of a current collector, thereby forming a first electrode-material layer;

a second application step of applying a second slurry, in which a second active material, a second conductive additive and a second binder resin have been mixed one another so as to make a binder-resin concentration that is higher than a binder-resin concentration in the first slurry, onto the surface of the current collector at least so as to make contact with the surface of the current collector and at least a side face of the first electrode-material layer, thereby forming a second electrode-material layer; and a curing step of curing the first binder resin and the second binder resin, thereby forming a first electrode layer and a second electrode layer.

The first application step, and the second application step are a step of applying a binder resin, an active material and a conductive additive onto one of the opposite surfaces of a current collector, respectively.

It is advisable that the first active material and the second active material can either be an identical active material to each other or different active materials from each other. Similarly, it is also allowable that the first conductive additive and the second conductive additive can either be an identical conductive additive to each other or different conductive additives from each other. It is even permissible that the first binder resin and the second binder resin can either bean identical binder resin to each other or different binder resins from each other.

An active material, a conductive additive, and a binder resin are the same as those being explained in the aforementioned electrode for lithium-ion secondary battery.

An active material used in the present invention has a powdery configuration. The aforementioned active material is bound together onto one of the opposite surfaces of a current collector via a binder resin. The "powdery configuration" means that it is preferable that a particle diameter of that active material can be 100 μm or less.

At an application step, it is possible to apply a slurry onto a current collector after mixing a binder resin, an active material and a conductive additive one another in advance and then adding a solvent or the like to them in order to turn them into the slurry. It is possible to carry out the application either onto one of the opposite surfaces of a current collector, or onto both of the opposite surfaces.

As to an application method, it is not limited especially as far as it is a method that is capable of doing the following: forming a first electrode-material layer by first applying a first slurry onto a current collector; and then forming a second electrode-material layer by applying a second slurry so as to make contact with one of the opposite surfaces of the current collector and at least a side face of the first electrode-material layer.

As an application method, it is possible to use an application method, which has been used commonly, such as roller coating methods, dip coating methods, doctor blade methods, spray coating methods, and curtain coating methods.

Moreover, it is also possible to do the application with use of a masking method, such as screen printing. For example, it is possible to do patterning a first electrode-material layer and a second electrode-material layer as needed configurations, respectively, onto a current collector by means of making a mask with a needed configuration; applying a first slurry after bonding the resulting mask onto a current collector in order to do masking a needed location on the current collector; and applying a second slurry after peeling off the mask.

It is preferable that mixing proportions between a first active material, a first conductive additive and a first binder resin in the first slurry can be from 60% by mass or more to 98% by mass or less for the active material, from 1% by mass or more to 20% by mass or less for the conductive additive, and from 1% by mass or more to 20% by mass or less for the binder resin, when the entirety is taken as 100% by mass. It is preferable that an application thickness of the first slurry can be from 5 μm to 300 μm. It can more preferably be from 10 μm to 100 μm. When setting a film thickness so as to fall in these ranges, it is possible to make electrodes that satisfy prescribed capacities and/or rate characteristics, and whose longevity characteristics are satisfactory.

In addition, it is preferable that mixing proportions between a second active material, a second conductive additive and a second binder resin in the second slurry can be from 20% by mass or more to 98% by mass or less for the active material, from 1% by mass or more to 20% by mass or less for the conductive additive, and from more than 1% by mass to 60% by mass or less for the binder resin, when the entirety is taken as 100% by mass. An application thickness of the second slurry to be applied onto a current collector can be from 1 μm to 300 μm, and it can more preferably be from 2 μm to 200 μm. When setting a film thickness so as to fall in these ranges, it is possible to satisfactorily relax or alleviate stresses that arise from parallelly-oriented expansions and contractions of the active material in the first slurry.

An application thickness of the second slurry to be applied onto the first electrode-material layer can be from 1 μm to 60 μm. It can more preferably be from 2 μm to 40 μm. When setting a film thickness so as to fall in these ranges, it is possible to satisfactorily relax or alleviate stresses that arise from perpendicularly-oriented expansions and contractions of the active material in the first slurry.

The curing step is a step of forming the first electrode layer and second electrode layer by curing the respective binder resins. It is advisable to carryout the curing of the binder resins in compliance with the curing conditions of binder resins to be employed.

It is possible to adapt the first application step into a step of forming a plurality of first electrode-material layers by applying a plurality of first slurries one after another onto a current collector. It is advisable to form the respective first electrode-material layers one after another by preparing a slurry for every one of the respective layers. On this occasion, it is preferable that binder-resin concentrations in the first electrode-material layers, which are present more away from the current collector, can be higher than binder-resin concentrations in the first electrode-material layers, which are present nearer to it.

It is possible to adapt the second application step as well into a step of forming a plurality of second electrode-material layers by applying a plurality of second slurries one after another onto a current collector. It is advisable to form the respective second electrode-material layers one after another by preparing a slurry for every one of the respective layers. On this occasion, it is preferable that binder-resin concentrations in the second electrode-material layers, which are present more away from the current collector, can be higher than binder-resin concentrations in the second electrode-material layers, which are present nearer to it.

EXAMPLES

Hereinafter, the present invention will be explained in more detail while giving specific examples.

Electrodes for lithium-ion secondary battery according to the present invention were made as hereinafter described, and then a discharging cycle test was carried out with use of a model battery for evaluation. In the test, a coin-shaped lithium-ion secondary battery, in which the negative electrode made an evaluated electrode, was used.

Making of Electrode for Evaluation

An electrode was made with use of the following: using an Si powder as the active material; and using an alkoxy group-containing silane-modified polyamic acid resin as the binder resin. The alkoxy group-containing silane-modified polyamic acid resin was produced by ARAKAWA CHEMICAL INDUSTRIES, LTD.; had a product name, COMPOCERAN; had a product number, H850D; had such a solvent composition as N,N-dimethylacetamide (or DMAc); had cured residuals in an amount of 15%; exhibited a viscosity of 4,100 mPa·s at 25° C.; and had silica in an amount of 2 wt. % in the cured residuals. Note that the alkoxy group-containing silane-modified polyamic acid resin was one of the aforementioned COMPOCERAN (product name) H800-series products, and had a structure that is specified in above (Chemical Formula 2).

As the Si powder, Si particles (produced by FUKUDA METAL FOIL & POWDER Co., Ltd.) with 10 μm or less in average particle diameter were used as they were. Moreover, as the conductive additive, KETJENBLACK (or KB produced by KETJENBLACK INTERNATIONAL Corp.) was used.

Example No. 1

In Example No. 1, an electrode was made in which a first electrode layer was formed on a current collector and a second electrode layer was formed so that it covered the current collector as well as the side face and one of the opposite surfaces of the first electrode layer.

A first slurry was prepared in Example No. 1 as follows: the Si powder was put in a paste in which the alkoxy group-containing silane-modified polyamic acid resin had been dissolved in N-methylpyrrolidone (or NMP); KETJENBLACK (or KB) was further added thereto; and then the resulting mixture was mixed. Mixing proportions were set at Si:KB:Resin=90:5:5 by % by weight. Note that "% by weight" is set forth herein to mean "% by mass."

Subsequently, a second slurry was prepared in which the aforementioned mixing proportions, Si:KB:Resin, were set at 75:5:20 by % by weight.

Figure 11:
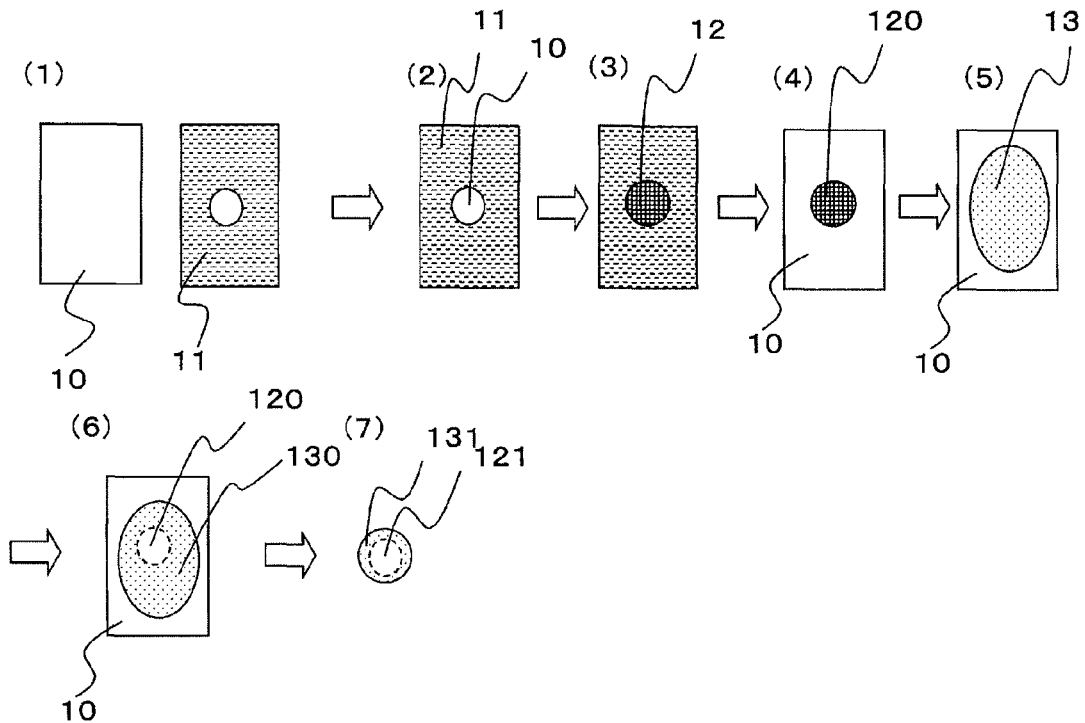
FIG. 11 is an explanatory diagram that shows a process for making an electrode according to Example No. 1.

These first slurry and second slurry were used to make an electrode as follows. FIG. 11 is an explanatory diagram that illustrates a method for making an electrode according to Example No. 1. FIG. 11 is used to illustrate a method for making the electrode.

As shown in (1) in FIG. 11, the following were made ready: an electrodeposited copper foil 10 with 18 μm in thickness, which served as a current collector; and a paraffin film 11 with 30 μm in thickness (produced by PLASTIC PACKAGING Corp.). Note that the paraffin film 11 had been provided with a ϕ11-mm hole at around the center.

As shown in (2) in FIG. 11, the paraffin film 11 was attached on the electrodeposited copper foil 10. Next, as illustrated in (3) in FIG. 11, a first slurry 12 was coated using a doctor blade so as to plug the hole that was formed in the paraffin film 11. The thus obtained sheet was dried at 80° C. for 1 minute in order to remove the NMP by volatilization.

As shown in (4) in FIG. 11, when the paraffin film 11 was taken off, a first electrode-material layer 120 with ϕ11 mm was formed on the electrodeposited copper foil 10.

Subsequently, as shown in (5) in FIG. 11, a second slurry 13 was coated using a doctor blade so as to cover the electrodeposited copper foil 10 and first electrode-material layer 120, thereby forming a second electrode-material layer 130. In (6) in FIG. 11, the dotted line specifies a position of the first electrode-material layer 120 that was disposed under the second electrode-material layer 130.

Thereafter, the current collector, and the electrode-material layers were adhered and joined firmly by means of a roller pressing machine after drying the thus obtained sheet at 80° C. for 20 minutes in order to remove the NMP by volatilization. Subsequently, the electrodeposited copper foil 10, on which the first electrode-material layer 120 and second electrode-material layer 130 were formed, was taken out by a circular punch with ϕ 16 mm. The thus taken-out electrodeposited copper foil 10, on which the first electrode-material layer 120 and second electrode-material 130 were formed, was heated at 200° C. for 3 hours by a vacuum drier, thereby curing the binder resin in the first electrode-material layer 120 and the binder resin in the second electrode-material layer 130. These made it possible to manufacture the electrode, as shown in (7) in FIG. 11 according to Example No. 1 on which a first electrode layer 121 and a second electrode layer 131 were formed.

This electrode according to Example No. 1 had dimensions, which are specified in FIG. 4, as follows: the thickness "c" was 30 μm; the thickness "d" was 10 μm; and the width "e" was 2.5 mm.

Example No. 2

Except that the mixing proportions between Si, KB and the binder resin in the second slurry were set at Si:KB:Resin=55: 5:40 by % by weight, an electrode according to Example No. 2 was formed in the same manner as Example No. 1.

Comparative Example No. 1

In Comparative Example No. 1, an electrode was formed in which only a first electrode layer was formed.

A first slurry was prepared in Comparative Example No. 1 as follows: the Si powder was put in a paste in which the alkoxy group-containing silane-modified polyamic acid resin had been dissolved in N-methylpyrrolidone (or NMP); KETJENBLACK (or KB) was further added thereto; and then the resulting mixture was mixed. Mixing proportions were set at Si:KB:Resin=90:5:5 by % by weight.

After preparing the aforementioned first slurry, the first slurry was placed on an electrodeposited copper foil with 18 μm in thickness, and then the first slurry was coated as a film shape on the electrodeposited copper foil using a doctor blade. The coated thickness of the first slurry was about 35 μm.

The current collector comprising the electrodeposited copper foil, and the electrode-material layer were adhered and joined firmly by means of a roller pressing machine after drying the thus obtained sheet at 80° C. for 20 minutes in order to remove the NMP by volatilization. This one was taken out by a circular punch with φ16 mm, and then the taken-out one was heated at 200° C. for 3 hours by a vacuum drier, thereby making this one into an electrode in which only a first electrode layer was formed. This electrode was labeled an electrode according to Comparative Example No. 1.

Comparative Example No. 2

In Comparative Example No. 2, a simply-laminated-type electrode was made in which a second electrode layer was formed on a first electrode layer alone.

Except that the coated thickness was changed to 30 μm, the first slurry was coated on a copper foil in the same manner as Comparative Example No. 1. The thus obtained sheet was dried at 80° C. for 1 minute.

In addition, a second slurry, in which the mixing proportions were set at Si:KB:Resin=75:5:20 by % by weight, was formed, was then placed on the first electrode-material layer, and was finally coated as a film shape using a doctor blade. The coated thickness of the second slurry was about 10 μm. In this instance, the second slurry did not at all contact the current collector.

The current collector comprising the electrodeposited copper foil, and the electrode-material layers were adhered and joined firmly by means of a roller pressing machine after drying the thus obtained sheet at 80° C. for 20 minutes in order to remove the NMP by volatilization. This one was taken out by a circular punch with φ16 mm, and then the taken-out one was heated at 200° C. for 3 hours by a vacuum drier, thereby making this one into an electrode. This electrode was labeled an electrode according to Comparative Example No. 2.

Comparative Example No. 3

Except that the mixing proportions between Si, KB and the binder resin in the second slurry were set at Si:KB:Resin=55: 5:40 by % by weight, an electrode according to Comparative Example No. 3 was formed in the same manner as Comparative Example No. 2. The coated thickness of the first slurry was about 30 μm. The coated thickness of the second slurry was about 10 μm.

Note that, when joining Example No. 1, Example No. 2 and Comparative Example Nos. 1 through 3 by means of a roller pressing machine, a film-thickness coordination was carried out so that a total capacity of the resulting electrodes became from 17 mAh/cm$^2$ to 22 mAh/cm$^2$. The electrode capacities on this occasion were computed from the masses of the active material by calculation. Moreover, the proportions between the thickness of the first electrode layer and that of the second electrode layer were set so as to be First Electrode Layer: Second Electrode Layer=8:2.

Making of Coin-Shaped Battery

A metallic lithium foil was used as a counter electrode to the electrodes being aforementioned. While using an electrolytic solution, which was made by dissolving LiPF$_6$ in an amount of 1 mol/L into a mixed solvent in which ethylene carbonate (or EC) and diethyl carbonate (or DEC) had been mixed in a volumetric ratio of EC:DEC=1:1, a coin-shaped model battery (or Type CR2032) was made within a glove box in an Ar atmosphere. The coin-shaped model battery was made by superimposing a spacer, an Li foil with 500 μmin thickness making the counter electrode, a separator ("Celgard #2400" (trademark name) produced by CELGARD, LLC), and one of the electrodes to be evaluated, in this order and then processing them by means of crimping.

Evaluation of Coin-Shaped Battery

An evaluation of the electrode for assessment in these model batteries was carried out by the following method.

First of all, the model batteries were discharged at a constant current of 0.7 mA until they arrived at exhibiting 0.01 V; after a 10-minute intermission, they were charged at a constant current of 0.7 mA until they arrived at exhibiting 1.0 V. These were labeled one cycle, and the discharged capacities were examined by carrying out the charging and discharging operations repeatedly.

Figure 12:
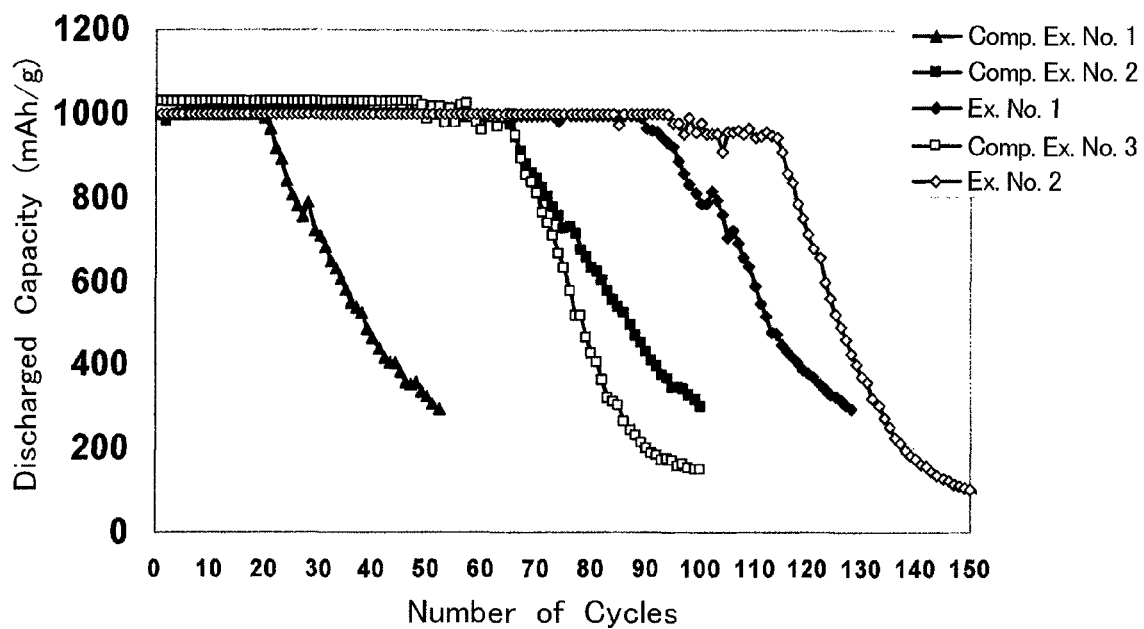
FIG. 12 is a graph that shows number of cycles and discharged capacities regarding model batteries according to Example No. 1, Example No. 2, Comparative Example No. 1, Comparative Example No. 2 and Comparative Example No. 3.

FIG. 12 shows a graph that illustrates the number of cycles and the discharged capacities regarding the model batteries according to Example No. 1, Example No. 2 and Comparative Example Nos. 1 through 3.

As illustrated in FIG. 12, compared with Comparative Example No. 1 that exhibited sharply decreasing discharged capacities since the twentieth cycle and on and Comparative Example No. 2 and Comparative Example No. 3 that exhibited sharply decreasing discharged capacities since the seventieth cycle and on, both Example No. 1 and Example No. 2 did not at all exhibited lowering discharged capacities after they underwent 90 cycles or more. From this fact, it is understood that disposing the second electrode layer on the current collector and the first electrode layer's side faces resulted in upgrading the cyclability by four times or more as much as that of one (i.e., Comparative Example No. 1) which did not comprise any second electrode layer, and moreover by from 1.3 times to 1.7 times as much as those of the others (i.e., Comparative Example No. 2, and Comparative Example No. 3) in which the second electrode layer was laminated simply on the first electrode layer but was not at all disposed on the current collector and the first electrode layer's side faces.

Moreover, when comparing Example No. 1 with Example No. 2, Example No. 2 whose binder-resin concentration in the second electrode layer was much higher was better in the cyclability than was Example No. 1.

The invention claimed is:

1. An electrode for a lithium-ion secondary battery comprising:
    a current collector; and
    an electrode layer being formed on a surface of said current collector,
    said electrode layer comprising:
        a first electrode layer including a first binder resin, a first active material and a first conductive additive; and
        a second electrode layer, including a second binder resin, a second active material and a second conductive additive, where a binder-resin concentration in the second electrode layer is higher than a binder-resin concentration in said first electrode layer;
        said first electrode layer being disposed on the surface of said current collector at least so as to make contact with the surface of said current collector; and
        said second electrode layer being disposed on the surface of said current collector at least so as to make contact with the surface of said current collector and a side face of said first electrode layer,
        said first electrode layer and said second electrode layer are each electrically conductive.

2. The electrode for lithium-ion secondary battery as set forth in claim 1, wherein:
    said first electrode layer has a surface that is formed as a rectangular configuration and said side face of said first electrode layer includes at least two side faces; and
    said second electrode layer is disposed so as to make contact with said at least two side faces of said first electrode layer at a position where said second electrode layer interposes said first electrode layer.

3. The electrode for lithium-ion secondary battery as set forth in claim 1, wherein said second electrode layer is disposed so as to make contact with all side faces of said first electrode layer.

4. The electrode for lithium-ion secondary battery as set forth in claim 1, wherein:
    said first electrode layer comprises a plurality of island-shaped portions or strip-shaped portions that distributes on said current collector; and
    said second electrode layer is disposed so as to bury between said island-shaped portions neighboring one another, or between said strip-shaped portions neighboring one another.

5. The electrode for lithium-ion secondary battery as set forth in claim 1, wherein said first electrode layer and/or said second electrode layer has a multi-layered structure comprising a plurality of layers whose binder-resin concentrations differ one another.

6. The electrode for lithium-ion secondary battery as set forth in claim 1 wherein said second electrode layer is disposed so as to further make contact with a surface of said first electrode layer.

7. The electrode for lithium-ion secondary battery as set forth in claim 6, wherein said side face of said first electrode layer includes a plurality of side faces, and all of the plurality of side faces are covered with said current collector and said second electrode layer.

8. The electrode for lithium-ion secondary battery as set forth in claim 1, wherein:
    the binder-resin concentration in said first electrode layer is from 1% by mass or more to 20% by mass or less; and
    the binder-resin concentration in said second electrode layer is more than 1% by mass and 60% by mass or less.

9. The electrode for lithium-ion secondary battery as set forth in claim 1, wherein said first binder resin and said second binder resin is one kind that is selected from the group consisting of alkoxy group-containing silane-modified bisphenol type-A epoxy resins, alkoxy group-containing silane-modified novolac-type epoxy resins, alkoxy group-containing silane-modified acrylic resins, alkoxy group-containing silane-modified phenolic resins, alkoxy group-containing silane-modified polyamic acid resins, alkoxy group-containing silane-modified soluble polyimide resins, alkoxy group-containing silane-modified polyurethane resins, and alkoxy group-containing silane-modified polyamide-imide resins.

10. The electrode for lithium-ion secondary battery as set forth in claim 1, wherein a concentration of the first active material in said first electrode layer is higher than a concentration of the second active material in said second electrode layer.

11. The electrode for lithium-ion secondary battery as set forth in claim 1, wherein said first active material and said second active material is one kind that is selected from the group consisting of Si, Sn and alloys including Si or Sn.

12. A manufacturing process for electrode for lithium-ion secondary battery, the manufacturing process comprising:
    a first application step of applying a first slurry, in which a first active material, a first conductive additive and a first binder resin have been mixed with one another, onto a surface of a current collector so as to contact the surface of the current collector, thereby forming a first electrode-material layer;
    a second application step, performed after the first application step, of applying a second slurry, in which a second active material, a second conductive additive and a second binder resin have been mixed with one another so as to make a binder-resin concentration that is higher than a binder-resin concentration in said first slurry, onto the surface of said current collector at least so as to make contact with the surface of said current collector and at least a side face of said first electrode-material layer, thereby forming a second electrode-material layer; and
    a curing step of curing said first binder resin and said second binder resin, thereby forming a first electrode layer and a second electrode layer.

* * * * *